United States Patent
Kale et al.

(10) Patent No.: US 11,741,157 B2
(45) Date of Patent: *Aug. 29, 2023

(54) PROPAGATING MULTI-TERM CONTEXTUAL TAGS TO DIGITAL CONTENT

(71) Applicant: Adobe Inc., San Jose, CA (US)

(72) Inventors: Ajinkya Kale, San Jose, CA (US); Baldo Faieta, San Francisco, CA (US); Benjamin Leviant, Mountain View, CA (US); Fengbin Chen, San Jose, CA (US); Francois Guerin, San Francisco, CA (US); Kate Sousa, San Jose, CA (US); Trung Bui, San Jose, CA (US); Venkat Barakam, Cupertino, CA (US); Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/544,689

(22) Filed: Dec. 7, 2021

(65) Prior Publication Data

US 2022/0100791 A1     Mar. 31, 2022

Related U.S. Application Data

(63) Continuation of application No. 16/525,366, filed on Jul. 29, 2019, now Pat. No. 11,232,147.

(51) Int. Cl.
*G06F 16/40* (2019.01)
*G06F 16/58* (2019.01)
(Continued)

(52) U.S. Cl.
CPC .... *G06F 16/5866* (2019.01); *G06F 16/24578* (2019.01); *G06F 16/43* (2019.01);
(Continued)

(58) Field of Classification Search
CPC ............... G06F 16/5866; G06F 16/43; G06F 16/24578; G06F 16/48; G06F 18/23213; G06V 20/35; G06V 2201/10
See application file for complete search history.

(56) References Cited

U.S. PATENT DOCUMENTS 8,411,953 B2 * 4/2013 Deluca ............... G06V 20/70
382/192
9,384,214 B2 * 7/2016 Slaney ............... G06F 16/583
(Continued)

OTHER PUBLICATIONS

Shane Bergsma and Qin Iris Wang. 2007. Learning Noun Phrase Query Segmentation. In EMNLP-CoNLL.
(Continued)

*Primary Examiner* — Tarek Chbouki
(74) *Attorney, Agent, or Firm* — Keller Preece PLLC

(57) ABSTRACT

Systems, methods, and non-transitory computer-readable media are disclosed for determining multi-term contextual tags for digital content and propagating the multi-term contextual tags to additional digital content. For instance, the disclosed systems can utilize search query supervision to determine and associate multi-term contextual tags (e.g., tags that represent a specific concept based on the order of the terms in the tag) with digital content. Furthermore, the disclosed systems can propagate the multi-term contextual tags determined for the digital content to additional digital content based on similarities between the digital content and additional digital content (e.g., utilizing clustering techniques). Additionally, the disclosed systems can provide digital content as search results based on the associated multi-term contextual tags.

20 Claims, 10 Drawing Sheets

(51) Int. Cl.
   *G06F 16/48*       (2019.01)
   *G06F 16/2457*     (2019.01)
   *G06F 16/43*       (2019.01)
   *G06V 20/00*       (2022.01)
   *G06F 18/23213*    (2023.01)

(52) U.S. Cl.
   CPC ........ *G06F 16/48* (2019.01); *G06F 18/23213* (2023.01); *G06V 20/35* (2022.01); *G06V 2201/10* (2022.01)

(56) References Cited

U.S. PATENT DOCUMENTS

| | | | |
|---|---|---|---|
| 11,048,979 B1* | 6/2021 | Zhdanov | G06F 18/2155 |
| 2013/0110620 A1* | 5/2013 | Zhu | G06F 16/50 707/751 |
| 2015/0363660 A1 | 12/2015 | Vidal et al. | |
| 2017/0193545 A1* | 7/2017 | Zhou | G06Q 30/0254 |
| 2019/0294705 A1* | 9/2019 | Kumar | G06F 16/5866 |
| 2020/0097764 A1 | 3/2020 | De Juan et al. | |
| 2020/0104599 A1* | 4/2020 | Ito | G06T 7/194 |
| 2020/0104633 A1* | 4/2020 | Zheng | G06Q 30/0643 |

OTHER PUBLICATIONS

T. Ge, K. He, Q. Ke, and J. Sun. 2013. Optimized Product Quantization for Approximate Nearest Neighbor Search. In 2013 IEEE Conference on Computer Vision and Pattern Recognition. 2946-2953. https://doi.org/10.1109/CVPR.2013. 379.

Jiafeng Guo, Gu Xu, Xueqi Cheng, and Hang Li. 2009. Named entity recognition in query. In SIGIR.

Kaiming He, Xiangyu Zhang, Shaoqing Ren, and Jian Sun. 2016. Deep Residual Learning for Image Recognition. 2016 IEEE Conference on Computer Vision and Pattern Recognition (CVPR) (Jun. 2016). https://doi.org/10.1109/cvpr.2016.90.

Wen Hua, Zhongyuan Wang, Haixun Wang, Kai Zheng, and Xiaofang Zhou. 2015. Short text understanding through lexical-semantic analysis. 2015 IEEE 31st International Conference on Data Engineering (2015), 495-506.

Figure Eight Inc. 2019. Data Annotation Platform. https://www.figure-eight.com/.

Yanen Li, Bo-June Paul Hsu, ChengXiang Zhai, and Kuansan Wang. 2011. Unsupervised query segmentation using clickthrough for information retrieval. In SIGIR.

Dhruv Kumar Mahajan, Ross B. Girshick, Vignesh Ramanathan, Kaiming He, Manohar Paluri, Mxuan Li, Ashwin Bharambe, and Laurens van der Maaten. 2018. Exploring the Limits of Weakly Supervised Pretraining. In ECCV.

Nikos Sarkas, Stelios Paparizos, and Panayiotis Tsaparas. 2010. Structured annotations of web queries. In SIGMOD Conference.

Xiangyan Sun, Haixun Wang, Yanghua Xiao, and Zhongyuan Wang. 2016. Syntactic Parsing of Web Queries. In Proceedings of the 2016 Conference on Empirical Methods in Natural Language Processing. Association for Computational Linguistics, Austin, Texas, 1787-1796. https://doi.org/10.18653/v1/D16-1184.

Zhongyuan Wang and Haixun Wang. 2016. Understanding Short Texts. the Association for Computational Linguistics (ACL) (Tutorial) (Aug. 2016).

Justin Zhijun Zhan and Binay Dahal. 2017. Using deep learning for short text understanding. Journal of Big Data 4 (2017), 1-15.

U.S. Appl. No. 16/525,366, filed May 17, 2021, Office Action.

U.S. Appl. No. 16/525,366, filed Sep. 22, 2021, Notice of Allowance.

* cited by examiner

PROPAGATING MULTI-TERM CONTEXTUAL TAGS TO DIGITAL CONTENT

CROSS-REFERENCE TO RELATED APPLICATIONS

The present application is a continuation of U.S. application Ser. No. 16/525,366, filed on Jul. 29, 2019. The aforementioned application is hereby incorporated by reference in its entirety.

BACKGROUND

Recent years have seen a significant increase in digital content (e.g., digital images and digital videos) available on electronic devices and the Internet. In particular, an increasing number of digital content is made available to individuals and businesses. For example, the ease of creating digital content on electronic devices, such as smart phones, has led to the creation and storage of large quantities of digital content. Furthermore, users may desire to find particular content. For instance, a user may desire to find digital content relating to a particular context. Although conventional digital visual systems enable users to create, view, modify, describe, upload, and search for digital content, they also have a number of significant shortcomings, particularly in regard to searching for or otherwise retrieving digital content.

For example, conventional digital visual systems oftentimes cannot easily, accurately, and/or efficiently utilize tags to search for and/or retrieve contextually relevant content in large collections in response to context provided in a search query (e.g., they are often unable to exploit the correlations among tags to improve relevance in retrieval of images). For instance, conventional digital visual systems often involve searching based on an inverted index of tag-to-image mappings. Many conventional digital visual systems utilize tags that fail to capture all of the concepts present in an image (e.g., the tags lack semantic completeness and/or fail to capture all levels of semantic granularity). Moreover, some conventional systems may pollute (i.e., spam) an image with excessive tags in an attempt to surface the image in as many queries as possible. However, such approaches often result in the conventional systems surfacing irrelevant images for search queries because of the excessive tags. Additionally, conventional digital visual systems often utilize bag-of-words models to associate tags with digital content, however such tags often lose context (or relationships between the tags).

As an example, some conventional digital visual systems can associate tags such as "boy," "red," "hat," "yellow," and "shirt" to an image portraying a boy with a red hat and yellow shirt. However, these conventional digital visual systems often provide such an image in response to a search query (e.g., a tag based search) that states "a boy with a yellow hat and red shirt" because the search query includes terms associated with the tags of the image. Indeed, many conventional systems determine and associate independent tags to images without preserving context and, as demonstrated above, affect the quality of search results. As a result, conventional digital visual systems often fail to easily, accurately, and/or efficiently utilize those tags to search for and/or retrieve contextually relevant content in response to context provided in a search query. For instance, conventional digital visual systems often inefficiently utilize computing resources by conducting additional search queries, responding to additional queries, and transmitting additional digital content due to the contextual inaccuracies in search results.

In addition, conventional digital visual media systems often fail to easily, accurately, and/or efficiently determine tags that are contextually relevant to the digital content in large collections of digital content (e.g., thousands or millions of images). In particular, many conventional digital visual systems identify objects portrayed in digital content to tag the digital content based on the identified objects. However, conventional digital visual systems often cannot easily, accurately, and/or efficiently determine context between the identified objects and determine tags that maintain such context for digital content in large collections. Indeed, oftentimes, conventional digital visual systems spend a lot of resources (e.g., money) to tag large collections of digital content accurately (e.g., with the context of the digital content intact) by using human annotators. Furthermore, sometimes, a large portion of digital content in many conventional digital visual systems does not get surfaced during search queries and/or does not receive user attention. As a result, in many conventional digital visual systems, contextually relevant tags are not generated for a majority of digital content items that do not have supervised labels.

SUMMARY

This disclosure describes one or more embodiments that provide benefits with systems, computer-readable media, and methods that accurately generate multi-term contextual tags for digital content (e.g., tags that represent a specific concept based on the order of the terms in the tag). In particular, the disclosed systems utilize a multi-modal learning framework to mine relevant tag combinations from search engine user behavior data and to propagate these across the image database (e.g., to other similar images). To illustrate, the disclosed systems can utilize search query supervision to determine and associate multi-term contextual tags and tag scores with images based on user selections to search queries including multi-term contextual tags. Furthermore, the disclosed systems can automatically propagate multi-term contextual tags to other images (e.g., images that infrequently receive user attention). For instance, the disclosed systems can identify visually similar neighbor images and associate multi-term contextual tags, that belong to one or more of the neighbor images, with each of the neighboring images by weighting and ranking the multi-term contextual tags. In this manner, the disclosed systems can allow efficient and accurate searching and retrieval of desired images that accurately portray the search query context.

For example, in order to generate multi-term contextual tags for digital content, in one or more embodiments, the disclosed systems can determine and associate one or more multi-term contextual tags with one or more digital content items based on a correspondence between user search queries, tags of the one or more digital content items, and user selections of the one or more digital content items in response to the user search queries. Furthermore, the disclosed systems can propagate the one or more multi-term contextual tags to one or more additional digital content items based on a similarity between the one or more additional digital content items and the one or more digital content items associated with the one or more multi-term contextual tags (e.g., using k-nearest neighbor techniques and based on a combination of tag scores and digital content item similarity scores). Additionally, the disclosed systems can receive an additional search query including a multi-term contextual tag and return a digital content item associated with the multi-term contextual tag.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1:
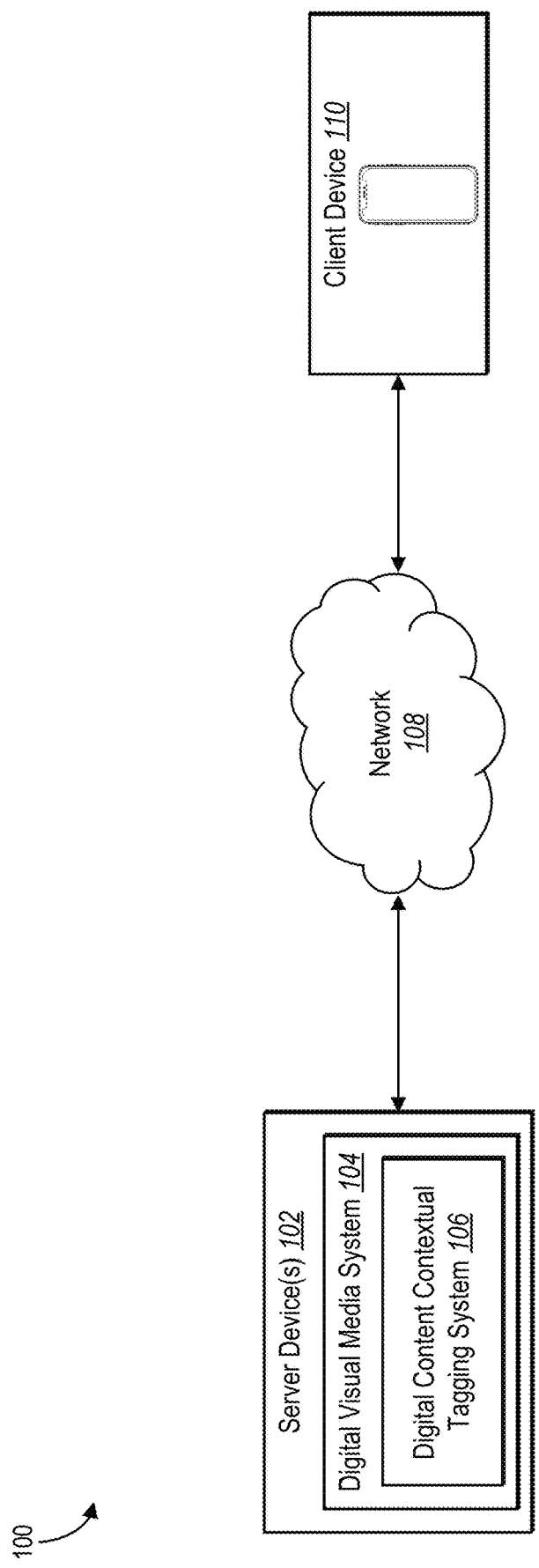
FIG. 1 illustrates a schematic diagram of an example environment in which a digital content contextual tagging system can operate in accordance with one or more embodiments.

One or more embodiments of the present disclosure include a digital content contextual tagging system that can determine multi-term contextual tags for digital content and propagate the multi-term contextual tags to additional digital content. In particular, the digital content contextual tagging system can utilize a multi-modal learning framework to mine relevant tag combinations from search engine user behavior data and propagate these across an image database (e.g., to other similar images). More specifically, based on the assumption that user behavior is a form of weak labeling, the digital content contextual tagging system utilizes user queries and their image click signal as one modality of signal and a deep neural network for image understanding as the other modality to perform visual grounding of tag correlations.

In the first stage, the digital content contextual tagging system mines tag-combinations from query-image clicks, which form the ground truth for associating tag-combinations with the clicked images. There is a large torso and tail of images which receive few or no clicks. In view of this, the digital content contextual tagging system utilizes visual similarity to propagate tag-combinations onto these images from the images which have high click-through. The digital content contextual tagging system also performs this process on images with existing click-through in order to reinforce and share tag-combinations via the visual similarity cues.

Thus, the digital content contextual tagging system can determine (e.g., by utilizing user behavior data to mine correlated tag combinations) multi-term contextual tags and automatically associate (via propagation) the multi-term contextual tags with additional digital content. By determining and associating multi-term contextual tags with digital content, the digital content contextual tagging system can enable search and retrieval of contextually relevant content from large collections that accurately portrays context provided in a search query.

In one or more embodiments, the digital content contextual tagging system determines and associates multi-term contextual tags (and scores) with images using a correspondence between user search queries, tags of the images, and user selections of the images in response to the user search queries. Furthermore, in some embodiments, the digital content contextual tagging system identifies additional images based on similarities with the images associated with the multi-term contextual tags (e.g., using a k-nearest neighbor algorithm to cluster the digital images). Then, in one or more embodiments, the digital content contextual tagging system propagates the multi-term contextual tags to the additional images based on a combination of tag scores and image similarity scores. Moreover, in some embodiments, the digital content contextual tagging system provides images that are associated with multi-term contextual tags in response to receiving search queries that include such multi-term contextual tags.

As previously mentioned, the digital content contextual tagging system can utilize search query supervision to determine and associate multi-term contextual tags and scores with images (e.g., utilize behavioral signals of a user as weak labels for an image). For example, the digital content contextual tagging system can determine a multi-term contextual tag from a search query (e.g., based on the terms in the search query). Additionally, the digital content contextual tagging system can identify a user selection of an image from search results corresponding to the search query. Then, the digital content contextual tagging system can associate the multi-term contextual tag with the selected image when the terms of the multi-term contextual tag include the tags associated with the selected image. In one or more embodiments, the digital content contextual tagging system also generates a tag score for the multi-term contextual tag associated with the image.

Furthermore, the digital content contextual tagging system can propagate multi-term contextual tags to one or more additional images. In particular, the digital content contextual tagging system can utilize one or more multi-term contextual tags that are associated with one or more images to propagate the multi-term contextual tags to one or more additional images. For instance, the digital content contextual tagging system can generate a cluster of images from a collection of images (e.g., utilizing a neural network and a k-nearest neighbor algorithm). Indeed, the cluster of images can include one or more images that are associated with multi-term contextual tags and images that are similar to those images (e.g., visually similar).

Additionally, the digital content contextual tagging system can identify images that have multi-term contextual tags (from the cluster). Then, the digital content contextual tagging system can utilize scores corresponding to such images and/or such multi-term contextual tags (e.g., tag scores and similarity scores) to generate aggregated scores for the multi-term contextual tags belonging to the cluster (e.g., by weighting the scores). Indeed, the digital content contextual tagging system can utilize the aggregated scores and/or other characteristics of the multi-term contextual tags (e.g., tag size) to rank the multi-term contextual tags. Furthermore, the digital content contextual tagging system can filter (or prune) the multi-term contextual tags based on the rankings to determine a final set (and/or list) of multi-term contextual tags for the cluster of images. Indeed, the digital content contextual tagging system can associate the final set of multi-term contextual tags with images from the cluster (e.g., which includes the additional images).

Furthermore, the digital content contextual tagging system can provide images that correspond to multi-term contextual tags as search results. For example, the digital content contextual tagging system can receive a search query and identify a multi-term contextual tag that matches the search query. Then, in one or more embodiments, the digital content contextual tagging system identifies one or more images that include the identified multi-term contextual tag. Upon identifying the one or more images, the digital content contextual tagging system can rank the images based on scores associated with the images and/or scores of the multi-term contextual tag corresponding to the images. Moreover, the digital content contextual tagging system can provide the one or more images based on the rankings as search results for the search query.

The digital content contextual tagging system of one or more implementations of the present disclosure provides advantages and benefits over conventional systems and methods by determining multi-term contextual tags for digital content utilizing search query supervision and propagating the multi-term contextual tags to additional neighboring digital content. For instance, by determining multi-term contextual tags that are contextually relevant to digital content and propagating such tags to additional similar digital content, the digital content contextual tagging system can enable increased accuracy and efficiency in searching for and tagging digital content within large collections of digital content.

In particular, by determining multi-term contextual tags that are contextually relevant to digital content, the digital content contextual tagging system can provide digital content with tags that maintain context between one or more concepts portrayed in the digital content. Indeed, by determining such multi-term contextual tags for digital content, the digital content contextual tagging system can accurately identify digital content that is more relevant to specific context presented in a search query compared to some conventional systems. As a result, the digital content contextual tagging system can enable users to search for digital content from large collections of digital content with more specificity (e.g., with search queries that describe a specific scenario) and provide content that is relevant to the specific search request. In addition, the digital content contextual tagging system enables increased efficiency by decreasing the number of search queries (and the computational resources corresponding to those search queries) by providing more relevant search results due to the determined multi-term contextual tags (e.g., by reducing the number of repeated search requests).

Furthermore, by propagating the multi-term contextual tags to additional neighboring digital content utilizing weighted aggregate tag scores, the digital content contextual tagging system can accurately and efficiently tag a large collection of digital content with relevant multi-term contextual tags. For example, by propagating the multi-term contextual tags to additional tags, the digital content contextual tagging system efficiently determines multi-term contextual tags for digital content that may not have such tags and/or may receive infrequent user attention (e.g., helping search systems with cold-start problems for new and/or rare content). Furthermore, by propagating the multi-term contextual tags to the additional digital content while utilizing weighted aggregate tag scores for the multi-term contextual tags, the digital content contextual tagging system can enable accurate searching within a large collection of digital content based on specific search queries that request a specific context. As mentioned above, some conventional digital visual media systems, in contrast, fail to accurately and efficiently determine and propagate tags that have contextual relevance to digital content.

As illustrated by the foregoing discussion, the present disclosure utilizes a variety of terms to describe features and advantages of the digital content contextual tagging system. Additional detail is now provided regarding the meaning of such terms. For example, as used herein, the word "digital content item" (sometimes referred to as "content item" or "digital media content item") can refer to any digital visual representation of an object, scene, story, event, picture, illustration, icon, symbol, and/or other content. As an example, a digital content item can include, but is not limited to, a digital image, a digital video, and/or electronic document. Indeed, the word "digital image" (sometimes referred to as "image") can include, but is not limited to, a digital file with the following extensions: JPG, TIFF, BMP, PNG, RAW, or PDF. Moreover, the word "digital video" can include, but is not limited to, a digital file with the following file extensions: FLV, SWF, AVI, WMV, MOV, QT, MKV, MP4, or AVCHD.

Furthermore, as used herein, the word "tag" can refer to a description (or information) including one or more terms and/or values. In particular, the word "tag" can refer to a description, that represents an object, scene, attribute, and/or another aspect (e.g., verbs, nouns, adjectives, etc.) portrayed in a digital content item (e.g., a digital image), with terms and/or values (e.g., a keyword). Indeed, the word "tag" can refer to conceptual labels (i.e., textual keywords) used to describe image attributes. As an example, a tag can include text within metadata for a digital media content item. Additionally, a tag can include text from a vocabulary (or dictionary). Moreover, as used herein, the word "tag characteristic" can refer to information indicating one or more attributes of a tag. In particular, the word "tag characteristic" can refer to information such as a tag size, tag complexity, and/or tag language. Furthermore, as used herein, the word "tag size" can refer to the length of a tag. In particular, the word "tag size" can refer to the length of a tag in regard to the number of characters of a tag and/or the number of terms in a tag.

As used herein, the word "multi-term contextual tag" can refer to a tag that includes a plurality of terms that represent a concept. In particular, the word "multi-term contextual tag" can refer to a tag that includes a plurality of terms that represent a concept based on a relation between the plurality of terms. Moreover, the word "multi-term contextual tag" can refer to a combination of tags which together form a fine-grained conceptual understanding of visual attributes of an image. For instance, a multi-term contextual tag can include a tag with multiple terms that represent and/or portray a specific concept (and/or scene) based on the order of the multiple terms within the tag. Indeed, a multi-term contextual tag can include a combination of tags and/or n-grams (e.g., in a specific order). As an example, a multi-term contextual tag can include a tag such as "red-hat," "yellow-shirt," "Christmas-tree," "a woman with a red dress and blue hat," "a person wearing a white animal shirt."

As used herein, the word "search query" can refer to a string of characters and/or terms that are provided to a search engine. In particular, the word "search query" can refer to a string of characters and/or terms provided by a user into a search engine in order to retrieve digital content. Furthermore, as used herein, the word "user selection" can refer to a user interaction that indicates a choice of a user. For example, a user selection can include mouse click and/or touch (e.g., on a touch screen) on a digital content item.

As used herein, the word "tag score" (sometimes referred to as a "multi-term contextual tag score") can refer to a value that represents a confidence and/or relevance of tag. In particular, the word "tag score" can refer to a value that represents a confidence and/or relevance of a tag (e.g., a multi-term contextual tag) in relation to a digital content item. For instance, a tag score can represent a confidence and/or relevance value that indicates the likelihood of a tag belonging to a digital content item. For example, a tag score can be a numerical value such as "0.95" for a multi-term contextual tag (e.g., "a woman wearing a red dress and a blue hat") for an image that portrays a woman wearing a red dress and a blue hat because the multi-term contextual tag represents the image. Furthermore, a tag score can be based on a selection frequency.

As used herein, the word "selection frequency" can refer to a number of times one or more users select a digital content item. In particular, the word "selection frequency" can refer to a number of times one or more users select a digital content item in response to search query (e.g., a query-click frequency). Furthermore, a selection frequency can represent the number of times one or more users select a digital content item in response to a search query belonging to a multi-term contextual tag. Indeed, the selection frequency can include a click-through rate.

Additionally, as used herein, the word "aggregated score" (sometimes referred to as an "aggregated multi-term contextual tag score," "aggregated tag score," or "aggregate score") can refer to weighted and/or a combination one or more tag scores belonging to a tag (e.g., a multi-term contextual tag). In particular, the word "aggregated score" can refer to weighted and/or a combination of one or more tag scores belonging to a multi-term contextual tag from one or more digital content items that indicates an illustrative multi-term contextual tag score across the one or more digital items that include the one or more tag scores belonging to the multi-term contextual tag.

As used herein, the word "neural network" can refer to a machine learning model that can be tuned (e.g., trained) based on inputs to approximate unknown functions. In particular, the word "neural network" can include a model of interconnected layers that communicate and analyze attributes at varying degrees of abstraction to learn to approximate complex functions and generate outputs based on a plurality of inputs provided to the model. For instance, the word "neural network" includes one or more machine learning algorithms (or models). In particular, the word "neural network" includes deep convolutional neural networks (e.g., "CNNs") and fully convolutional neural networks (e.g., "FCNs"). In other words, a neural network includes an algorithm that implements deep learning techniques, i.e., machine learning that utilizes a set of algorithms to attempt to model high-level abstractions in data.

As used herein, the word "descriptor" can refer to a set of values representing characteristics and/or attributes (i.e., features) of content such as a digital image. In particular, the word "descriptor" includes a set of values corresponding to latent and/or patent attributes and/or characteristics (i.e., visual features) related to digital content (e.g., an image signature and/or feature vector). For instance, a descriptor can include a floating point vector in a higher dimensional space for a digital image extracted using a neural network.

As used herein, the word "cluster" can refer to a grouping represented by a relationship between digital content. In particular, the word "cluster" can refer to a grouping represented by a relationship between one or more characteristics and/or attributes (e.g., descriptors) of digital content. For example, a cluster can include a grouping of digital content that are semantically similar (based on descriptors of the images) in a feature space. For instance, a cluster can include a group or set of digital images that are identified as neighbors utilizing a k-nearest neighbor algorithm.

As used herein, the word "k-nearest neighbor algorithm" can refer to a method for clustering digital content (utilizing classification and/or regression) based on descriptors corresponding to the digital content. For example, a k-nearest neighbor algorithm can determine distances between digital content features and a selected class (or attribute) in a feature space to cluster a select number (e.g., a k number) of digital content that is nearest to the selected class. As used herein, the word "distance value" (sometimes referred to as "distance") can refer to a value that represents the amount of space between a digital content item and a center of a cluster within a feature space. Furthermore, the word "distance value" can refer to one or more values representing quantifications of similarities between a plurality of features of digital content items. For instance, a distance value can include a value that represents the amount of space between neighboring digital content items within a cluster (e.g., based on a feature space of the cluster).

As used herein, the word "digital content item similarity score" (sometimes referred to as "similarity score" or "digital image similarity score") can refer to a value that represents a confidence value for the similarity between digital content and/or between digital content and a feature represented by a cluster. In particular, the digital content item similarity score can be a confidence score that corresponds to how closely a digital content item belongs to a cluster of digital content (e.g., based on distance values).

Furthermore, as used herein, the word "ranking score" (sometimes referred to as a "ranking") can refer to a value and/or ordering that represents a position of an item relative to other items. In particular, the word "ranking score" can refer to a value and/or ordering that represents a hierarchical position of a multi-term contextual tag in relation to other multi-term contextual tags based on the relevance of the multi-term contextual tags to a digital content item and/or cluster of digital content. For instance, a ranking score can include a normalized score (from 0 to 1) for multi-term contextual tags that determines a hierarchical position for the multi-term contextual tags in a list or set (e.g., 0 being the lowest rank and 1 being the highest rank).

Turning now to the figures, FIG. 1 illustrates a schematic diagram of one embodiment of an exemplary environment 100 in which a digital content contextual tagging system 106 can operate. As illustrated in FIG. 1, the exemplary environment 100 includes server device(s) 102, a network 108, and a client device 110. As further illustrated in FIG. 1, the server device(s) 102 and the client device 110 can communicate via the network 108. Although FIG. 1 illustrates the server device(s) 102 and the client device 110 communicating via the network 108, the various components of the environment 100 can communicate and/or interact via other methods (e.g., the server device(s) 102 and the client device 110 can communicate directly). Furthermore, although FIG. 1 illustrates the digital content contextual tagging system 106 being implemented by a particular component and/or device within the environment 100, the digital content contextual tagging system 106 can be implemented, in whole or in part, by other computing devices and/or components in the environment 100.

As shown in FIG. 1, the server device(s) 102 can include a digital visual media system 104 which further includes the digital content contextual tagging system 106. In particular, the digital content contextual tagging system 106 can determine multi-term contextual tags and/or associate multi-term contextual tags with digital content items utilizing search query supervision in accordance with one or more embodiments herein. Furthermore, the digital content contextual tagging system 106 can propagate one or more multi-term contextual tags belonging to one or more digital content items to other digital content items within a collection of digital content utilizing clustering and/or weighted tag scores in accordance with one or more embodiments herein. Additionally, the digital content contextual tagging system 106 can utilize the determined and/or propagated multi-term contextual tags belonging to the digital content items to enable functionalities for the digital content items (e.g., search capabilities for images having one or more multi-term contextual tags) in accordance with one or more embodiments herein. Furthermore, the server device(s) 102 (e.g., via the digital content contextual tagging system 106) can store digital content (e.g., digital images and/or digital videos) with corresponding multi-term contextual tags. Moreover, the server device(s) 102 can include a variety of types of computing devices, including those explained below with reference to FIG. 9.

Additionally, as mentioned above and as shown in FIG. 1, the environment 100 includes the client device 110. In one or more embodiments, the client device 110 may include, but is not limited to, a mobile device (e.g., smartphone, tablet), a laptop, a desktop, or any other type of computing device, including those explained below with reference to FIG. 9. Furthermore, although not shown in FIG. 1, the client device 110 can be operated by a user to perform a variety of functions. In particular, the client device 110 can perform functions such as, but not limited to, creating, storing, uploading, and/or modifying a variety of digital content items (e.g., a digital image). For example, the client device 110 can communicate with the server device(s) 102 via the network 108 to provide one or more digital images to the server device(s) 102. Additionally, the client device 110 can interact with digital images on the server device(s) 102 and/or conduct search queries for digital images on the server device(s) 102 and/or the network 108. For example, the client device can conduct a search query, receive one or more result images in response to the search query, and select one or more images from the result images. Although FIG. 1 illustrates the environment with the client device 110, the environment 100 can include a plurality of client devices.

Additionally, as shown in FIG. 1, the exemplary environment 100 includes the network 108. As mentioned above, the network 108 can enable communication between components of the environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 102, the client device 110, and the network 108 may communicate using any communication platforms and technologies suitable for transporting data and/or communication signals, including any known communication technologies, devices, media, and protocols supportive of data communications, examples of which are described with reference to FIG. 9.

Figure 2:
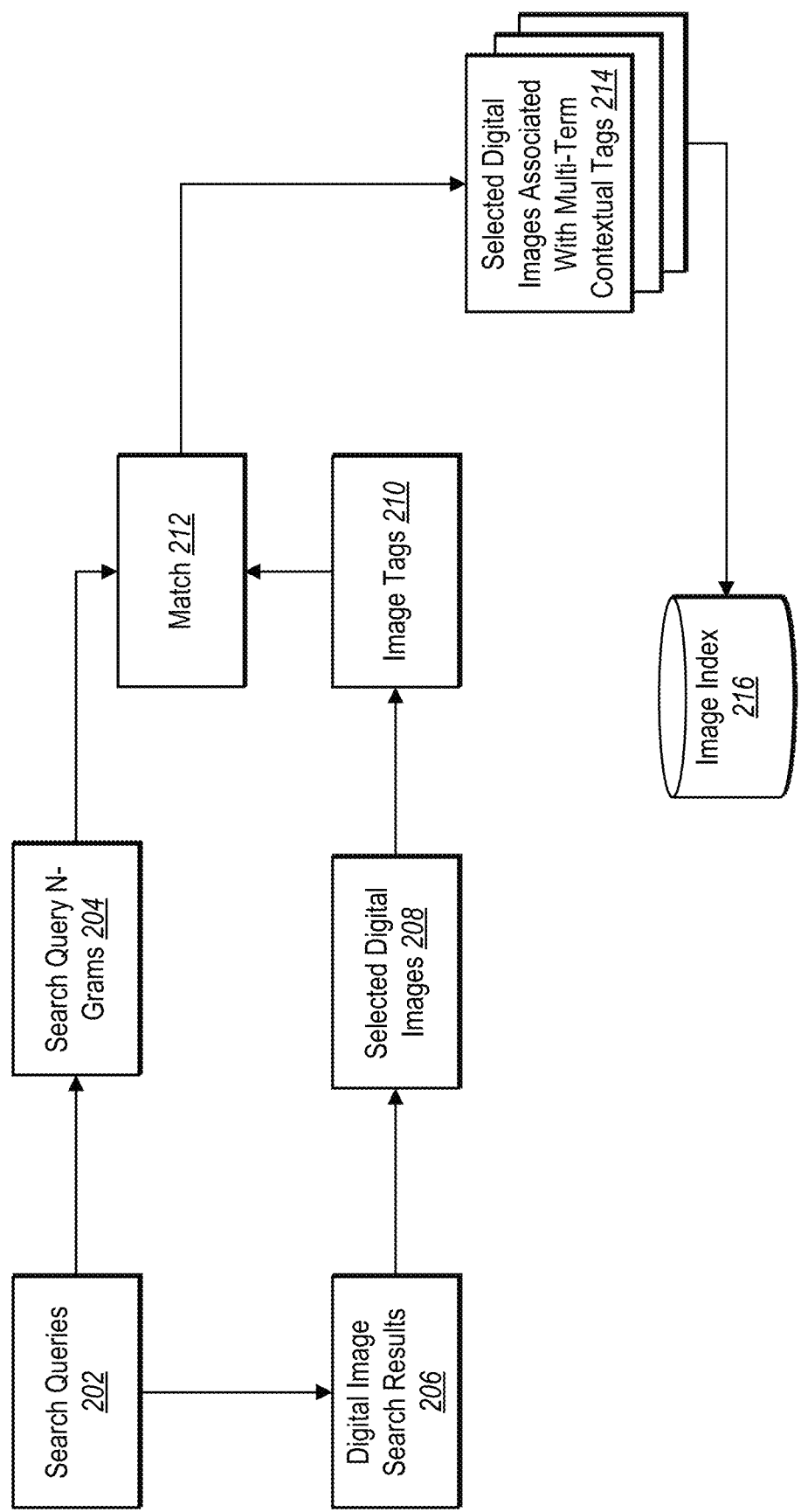
FIG. 2 illustrates a flowchart of a digital content contextual tagging system determining and associating multi-term contextual tags using search query supervision in accordance with one or more embodiments.

As mentioned above, the digital content contextual tagging system 106 can utilize search query supervision to determine and associate multi-term contextual tags and scores with images. For example, the flowchart illustrated in FIG. 2 provides an overview of the digital content contextual tagging system 106 determining and associating multi-term contextual tags with digital images. A more detailed description of the digital content contextual tagging system 106 determining and associating multi-term contextual tags utilizing search query supervision is discussed in reference to FIG. 4.

As shown in FIG. 2, the digital content contextual tagging system 106 can receive search queries 202 from a client device. Moreover, as illustrated in FIG. 2, the digital content contextual tagging system 106 can provide digital image search results 206 in response to the search queries 202. Then, the digital content contextual tagging system 106 can identify (or detect) selected digital images 208 from user selections of one or more of the digital image search results 206 from a client device.

Additionally, as shown in FIG. 2, the digital content contextual tagging system 106 can determine a search query n-gram 204 as the multi-term contextual tag. Moreover, as illustrated in FIG. 2, the digital content contextual tagging system 106 can identify image tags 210 corresponding to the selected digital images 208. Then, in reference to FIG. 2, the digital content contextual tagging system 106 can perform an act 212 of matching the search query n-gram 204 and the image tags 210 of the selected digital images 208 to determine which selected images to associate with the multi-term contextual tag (to result in the selected digital images associated with multi-term contextual tag 214). In addition, the digital content contextual tagging system 106 can generate, update, and/or include a tag score for the multi-term contextual tag for the selected digital images associated with the multi-term contextual tag 214 in accordance with one or more embodiments herein.

Furthermore, as shown in FIG. 2, the digital content contextual tagging system 106 includes the selected digital images that are associated with the multi-term contextual tags 214 into an image index 216. Indeed, the digital content contextual tagging system 106 can include tag scores corresponding to the selected digital images that are associated with the multi-term contextual tag 214 in the image index 216. Furthermore, the image index 216 can include a variety of images that include multi-term contextual tags, other tags, and/or no tags (e.g., no multi-term contextual tags). Moreover, the digital content contextual tagging system 106 can also provide search results for search queries (e.g., search query 202) from the image index 216.

Figure 3:
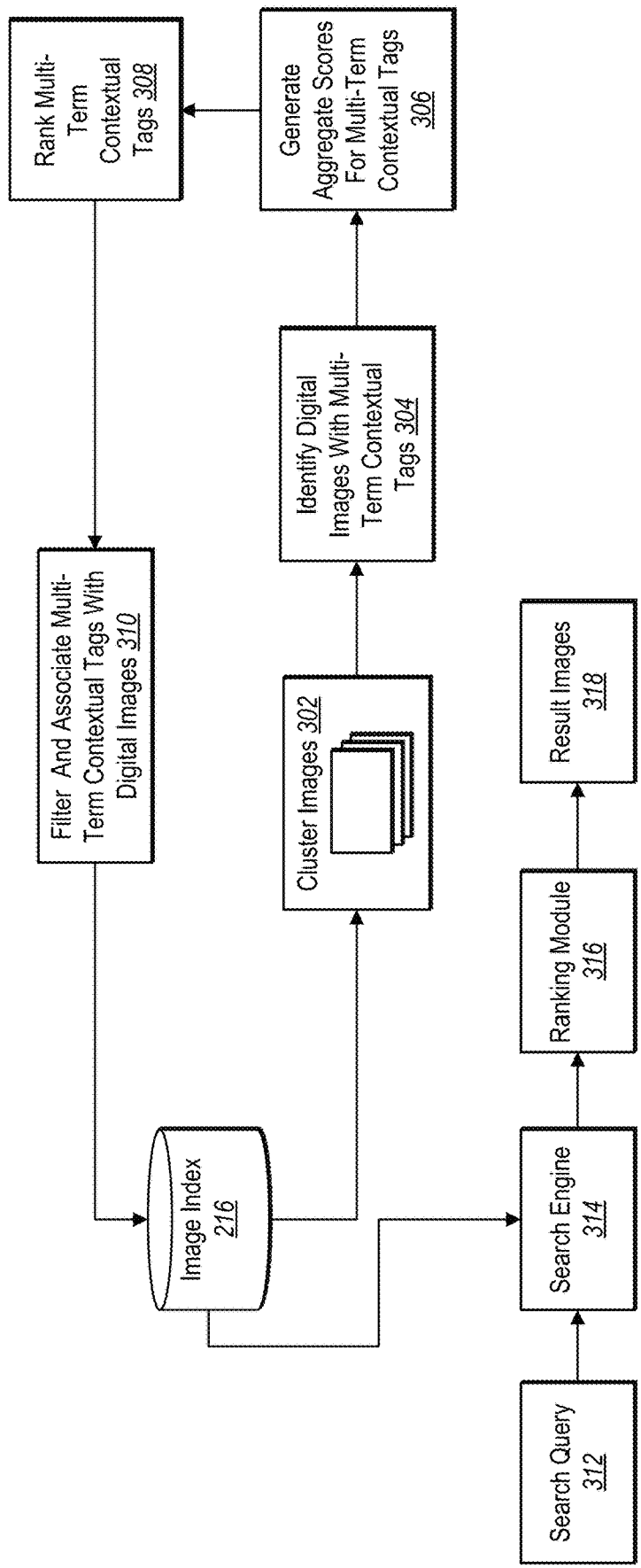
FIG. 3 illustrates a flowchart of a digital content contextual tagging system propagating multi-term contextual tag to additional digital content in accordance with one or more embodiments.

Furthermore, as previously mentioned, the digital content contextual tagging system 106 can automatically propagate one or more multi-term contextual tags existing in a collection of images to additional images within the collection. For instance, FIG. 3 illustrates a flowchart that provides an overview of the digital content contextual tagging system 106 propagating multi-term contextual tags to additional digital images. Additionally, FIG. 3 also illustrates an overview of the digital content contextual tagging system 106 utilizing multi-term contextual tags to provide digital images in response to search queries. A more detailed description of the digital content contextual tagging system 106 propagating multi-term contextual tags to additional digital images is discussed in reference to FIGS. 5A and 5B.

As illustrated in FIG. 3, the digital content contextual tagging system 106 can cluster digital images in act 302 from the image index 216 (e.g., the image index 216 of FIG. 2). The digital image clusters can include digital images that are similar to each other (e.g., k-nearest neighbors). Indeed, the digital content contextual tagging system 106 can generate any number of clusters for digital images for any number of images in act 302. A more detailed description of the digital content contextual tagging system 106 generating clusters is described in greater detail in FIG. 5A.

Moreover, the digital content contextual tagging system 106 can utilize the clusters to propagate multi-term contextual tags to additional digital images. For instance, as shown in FIG. 3, the digital content contextual tagging system 106 can identify digital images with multi-term contextual tags (and corresponding tag scores and/or similarity scores) in act 304 from within a cluster of images (of act 302). Moreover, the digital content contextual tagging system 106 can generate, from the identified digital images of act 304, aggregated scores for the multi-term contextual tags in act 306. For instance, the digital content contextual tagging system 106 can provide weights to the aggregated scores (of act 306) utilizing various factors such as the tag scores and/or similarity scores corresponding to the identified digital images (of act 304). A more detailed description of the digital content contextual tagging system 106 identifying digital images that include multi-term contextual tags from a cluster of images and/or aggregating scores for multi-term contextual tags corresponding to the identified digital images is described in greater detail in FIG. 5B.

Furthermore, as shown in FIG. 3, the digital content contextual tagging system 106 can rank the multi-term contextual tags that have aggregated scores (from act 306). In one or more embodiments, the digital content contextual tagging system 106 ranks the multi-term contextual tags based on the aggregated scores and/or other characteristics of the multi-term contextual tags. In particular, the multi-term contextual tags can be ranked based on the aggregated scores and/or other characteristics of the multi-term contextual tags as described in greater detail in FIG. 5B.

Moreover, as illustrated in FIG. 3, the digital content contextual tagging system 106 can filter and associate multi-term contextual tags in act 310 to the clustered images (of act 302) by utilizing the rankings from act 308. In particular, the digital content contextual tagging system 106 can utilize the rankings of the multi-term contextual tags to determine a final set (or list) of multi-term contextual tags. Then, the digital content contextual tagging system 106 can propagate the multi-term contextual tags to the cluster of images by associating the list of multi-term contextual tags to the digital images from the cluster of images (of act 302). A more detailed description of the digital content contextual tagging system 106 filtering and associating multi-term contextual tags with additional digital images is described in greater detail in FIG. 5B. Furthermore, as shown in FIG. 3, the digital content contextual tagging system 106 can provide the digital images and the associated multi-term contextual tags from act 310 to the image index 216.

Moreover, the digital content contextual tagging system 106 can provide digital images as search results based on multi-term contextual tags. For example, as shown in FIG. 3, the digital content contextual tagging system 106 can receive a search query 312. Additionally, as shown in FIG. 3, the digital content contextual tagging system 106 can utilize a search engine 314 to identify one or more digital images from the image index 216 by utilizing multi-term contextual tags corresponding to the one or more digital images and the search query 312. Furthermore, the digital content contextual tagging system 106 can utilize a ranking module 316 to rank the one or more digital images identified by the search engine 314 (e.g., based on aggregated tag scores corresponding to the one or more digital images). Additionally, as shown in FIG. 3, the digital content contextual tagging system 106 can provide the result digital images 318, that include multi-term contextual tags that match the search query 312, based on the ranking. A more detailed description of the digital content contextual tagging system 106 providing digital images corresponding to multi-term contextual tags in response to search queries is discussed in reference to FIG. 6.

Figure 4:
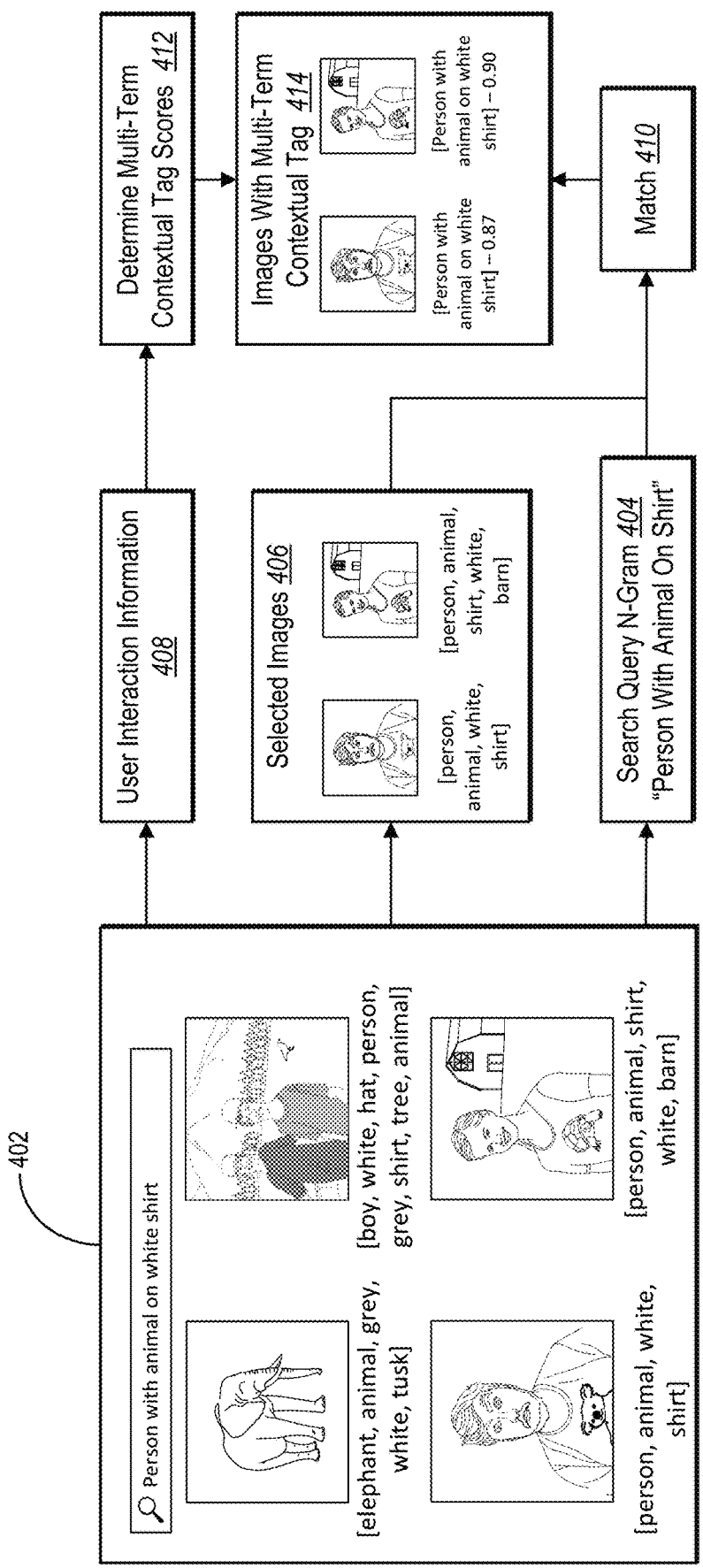
FIG. 4 illustrates a digital content contextual tagging system determining and associating multi-term contextual tags using search query supervision in accordance with one or more embodiments.

As previously mentioned, the digital content contextual tagging system 106 can determine and associate one or more multi-term contextual tags with one or more images. For instance, FIG. 4 illustrates the digital content contextual tagging system 106 determining and associating one or more multi-term contextual tags with one or more images. In particular, FIG. 4 illustrates the digital content contextual tagging system 106 utilizing search query supervision to determine multi-term contextual tags and associating the one or more multi-term contextual tags with one or more images from the search results.

For example, as shown in FIG. 4, the digital content contextual tagging system 106 can receive a search query in an interface 402 (e.g., "person with animal on white shirt"). Additionally, as illustrated in FIG. 4, the digital content contextual tagging system 106 can provide digital images as search results in response to the search query in the interface 402. Indeed, as shown in FIG. 4, the digital content contextual tagging system 106 provides digital images that include tags related to one or more terms in the search query.

As an example, FIG. 4 illustrates the digital content contextual tagging system 106 providing digital images portraying an animal, persons wearing white hats and grey shirts, and persons wearing white shirts with animals on the shirts in the interface 402 (e.g., based on tags associated with the digital image and in response to the search query). As previously mentioned, conventional independent tags often fail to enable efficient and accurate searching and/or retrieval of desired images with the search query context intact (e.g., the search query in interface 402 returns images portraying an animal and persons with white hats and grey shirts in response to the search query having the terms "animal," "person," "white," and "shirt").

Moreover, as shown in FIG. 4, the digital content contextual tagging system 106 can detect user selections of digital image search results. In particular, the digital content contextual tagging system 106 identifies selected images 406 from user selections within the interface 402. As illustrated in FIG. 4, the digital content contextual tagging system 106 identifies user selections of the digital images portraying a "person with animal on white shirt" from the image search results as the selected images 406. Additionally, as shown in FIG. 4, the digital content contextual tagging system 106 also identifies a search query n-gram 404 from the search query in the interface 402.

Then, as illustrated in FIG. 4, the digital content contextual tagging system 106 can match (in act 410) the tags associated with the selected images 406 with the search query n-gram 404 to determine which images from the selected images 406 to associate with a multi-term contextual tag determined from the search query. For instance, as shown in FIG. 4, the digital content contextual tagging system 106 determines that the selected images 406 include the terms from the search query n-gram 404 (in act 410). As such, FIG. 4 illustrates the digital content contextual tagging system 106 associating images with a multi-term contextual tag 414 (e.g., "person with animal on white shirt").

Furthermore, as shown in FIG. 4, the digital content contextual tagging system 106 can determine multi-term contextual tag scores for the selected images. For example, as illustrated in FIG. 4, the digital content contextual tagging system 106 can identify user interaction information 408 such as user selections in response to the search query from interface 402. Moreover, as shown in FIG. 4, the digital content contextual tagging system 106 can utilize the user interaction information 408 to determine multi-term contextual tag scores in act 412 for selected images (e.g., user click frequencies). Indeed, as illustrated in FIG. 4, the digital content contextual tagging system 106 can associate tag scores with the images with the multi-term contextual tag 414 (e.g., "0.87" and "0.9" represent a user selection frequency score associated with the selected images and the corresponding multi-term contextual tag).

As previously mentioned, the digital content contextual tagging system 106 utilizes a search query to determine and/or associate multi-term contextual tags to one or more digital images (e.g., the search query in the interface 402 in FIG. 4). Indeed, the digital content contextual tagging system 106 can receive a search query that includes any string of text. Furthermore, the digital content contextual tagging system 106 can utilize a search engine to provide one or more search results based on the string of text of the search query. For instance, the digital content contextual tagging system 106 can provide one or more images that include independent tags and/or multi-term contextual tags that match the search query.

Moreover, the digital content contextual tagging system 106 can utilize the search query to determine a multi-term contextual tag. For example, in one or more embodiments, the digital content contextual tagging system 106 utilizes the entire string of text of the search query as a multi-term contextual tag. For instance, the multi-term contextual tag can be an entire sentence and/or phrase provided as a search query. In some embodiments, the digital content contextual tagging system 106 creates a multi-term contextual tag from a search query n-gram determined from the search query.

For instance, the digital content contextual tagging system 106 can determine an n-gram from a search query (e.g., search query n-gram). For example, the digital content contextual tagging system 106 can utilize an n-gram model to determine one or more sequences stemming from text of a search query (e.g., from a text string). In some embodiments, the digital content contextual tagging system 106 utilizes the search query n-gram sequence to correct spelling and/or other typos within the search query. In particular the digital content contextual tagging system 106 can utilize an n-gram model to segment the search query into one or more n-gram sequences of words and find an n-gram sequence that is likely to match the search query from a corpus of n-grams (e.g., based on a probability of occurrence of the sequence of words and overlap between the sequence and the n-gram from the corpus).

Moreover, the digital content contextual tagging system 106 can utilize the determined n-gram as the multi-term contextual tag. Furthermore, the digital content contextual tagging system 106 can utilize various n-gram sizes (e.g., a 2-gram, 3-gram, 9-gram, etc.) of a search query to determine (or generate) one or more multi-term contextual tags from the search query. For instance, in reference to FIG. 4, the digital content contextual tagging system 106 can generate a 6-gram sequence for the search query (e.g., "person with animal on white shirt" as search query n-gram 404). Additionally, the digital content contextual tagging system 106, in reference to FIG. 4, can also generate other sizes of n-grams for the search query (e.g., 4-gram sequences that include "person with animal on," "with animal on white," and "animal on white shirt").

Additionally, the digital content contextual tagging system 106 can identify user selections of images from image search results. In particular, the digital content contextual tagging system 106 can identify one or more images that are selected by a user in response to a search query. The digital content contextual tagging system 106 can also identify other user interactions with regards to the images from an image search result. For instance, the digital content contextual tagging system 106 can identify interactions such as feedback (e.g., marking an image as relevant and/or irrelevant), bookmarking an image, saving an image from the search results, purchasing an image from the search results, and/or sharing an image from the search results.

Furthermore, upon identifying user selections of (or other user interactions with) one or more images from an image search result, the digital content contextual tagging system 106 can identify information for the one or more selected digital images. For instance, the digital content contextual tagging system 106 can identify tags that are associated with the one or more digital images selected by a user. For instance, the digital content contextual tagging system 106 can identify one or more independent tags associated with each digital image of the one or more selected digital images. Furthermore, the digital content contextual tagging system 106 can also identify multi-term contextual tags that are associated with the one or more selected images (e.g., multi-term contextual tags that may have been determined earlier and/or previously propagated to one or more images by the digital content contextual tagging system 106).

Additionally, the digital content contextual tagging system 106 can associate multi-term contextual tags upon identifying user selections of (or other user interactions with) one or more images from an image search result. In particular, the digital content contextual tagging system 106 can compare the search query (and/or search query n-gram) and tags (or other information) associated with the one or more selected images from the search results to determine which selected image will be associated with a multi-term contextual tag. For example, the digital content contextual tagging system 106 can associate an image with a multi-term contextual tag (determined from the search query) if the image tags include all of the terms present in the search query. In some embodiments, the digital content contextual tagging system 106 associates an image with a multi-term contextual tag if the image tags include a threshold percentage of the terms present in the search query (e.g., if 90% of the search query terms are included as tags for the digital image).

Furthermore, the digital content contextual tagging system 106 can compare the tags of the digital image with the significant keywords of a search query. For instance, the digital content contextual tagging system 106 can determine, utilizing a natural language processing technique, significant keywords within a search query. Then, the digital content contextual tagging system 106 determines whether a selected digital image includes all of the significant keywords within the search query. Indeed, if the selected digital image does include all of the significant keywords determined in the search query, the digital content contextual tagging system 106 can associate a multi-term contextual tag (from the search query) to the selected digital image.

Moreover, upon matching the tags associated with a selected digital image and the terms of a search query (and/or terms of a multi-term contextual tag resulting from the search query) using one or more of the approaches discussed above, the digital content contextual tagging system 106 can associate the multi-term contextual tag with the selected digital image. For instance, digital content contextual tagging system 106 can index the selected digital image to be associated with multi-term contextual tag within an image index, such as image index 216, (and/or a repository). Indeed, the multi-term contextual tag can be associated with the digital image as metadata, as embedded information, as linked information, or by utilizing any other tagging techniques.

Additionally, the digital content contextual tagging system 106 can determine a tag score for a digital image that includes a multi-term contextual tag. In particular, the digital content contextual tagging system 106 can utilize one or more user interactions (e.g., based on a user behavioral log) with a digital image to assign and/or update a tag score that corresponds to a multi-term contextual tag. For instance, the digital content contextual tagging system 106 can determine a query-click frequency for a digital image to assign and/or update a tag score. Indeed, the digital content contextual tagging system 106 can track how often a digital image is selected, from one or more users, in response to a search query (e.g., a search query that corresponds to a multi-term contextual tag). Moreover, the digital content contextual tagging system 106 can utilize the number of times the digital image is selected in response to a search query to generate a tag score for the multi-term contextual tag (from the search query) for the selected digital image. Indeed, the digital content contextual tagging system 106 can assign a tag score to a combination of a multi-term contextual tag and a digital image.

Furthermore, the digital content contextual tagging system 106 can utilize other user interactions to assign a tag score for a multi-term contextual tag in correspondence to a digital image. For example, the digital content contextual tagging system 106 can assign and/or update the tag score based on interactions such as bookmarking the digital image, saving the digital image within a collection of images associated with the multi-term contextual tag, purchasing the digital image, and/or user feedback. Indeed, the digital content contextual tagging system 106 can assign and/or update tag scores for one or more multi-term contextual tags and their correspondences with one or more digital images utilizing the approaches described above. Furthermore, the digital content contextual tagging system 106 can continuously track search queries to update multi-term contextual tag scores associated with digital images when a digital image that includes a multi-term contextual tag is selected by a user using a search query that corresponds to the multi-term contextual tag.

In one or more embodiments, the digital content contextual tagging system 106 utilizes rate of clicks as the multi-term contextual tag score. In particular, the digital content contextual tagging system 106 can utilize a rate of clicks (e.g., the frequency at which a digital image is selected in response to a search query corresponding to a multi-term contextual tag) as the tag score for a digital image. Indeed, the digital content contextual tagging system 106 can assign a variety of types of tag scores to a digital image. For instance, the digital content contextual tagging system 106 can utilize a percentage and/or a normalized score corresponding to a user-click frequency and/or some other user interaction as a multi-term contextual tag score for a digital image (e.g., a selection frequency).

Although FIG. 4 illustrates the digital content contextual tagging system 106 determining and associating one multi-term contextual tag with the one or more digital images, the digital content contextual tagging system 106 can determine and associate multiple multi-term contextual tags for a digital image. Furthermore, the digital images retrieved as part of a search request can include any number of tags that are relevant and/or not relevant to a search query. Moreover, the digital content contextual tagging system 106 can determine and associate one or more multi-term contextual tags to a digital image based on multiple search queries (e.g., for a similar topic and/or other topic). Indeed, the digital content contextual tagging system 106 can utilize one or more digital images as results in separate search queries and associate multi-term contextual tags corresponding to the separate search queries to the one or more digital images multiple times in accordance with one or more embodiments herein.

Furthermore, the digital content contextual tagging system 106 can utilize search engine logs to determine multi-term contextual tags for digital images and/or tag scores for the digital images. In particular, the digital content contextual tagging system 106 can aggregate multi-term contextual tags determined from search queries and images selected in response to those search queries from a search engine log. Furthermore, the digital content contextual tagging system 106 can utilize such aggregated multi-term contextual tag and image combinations to determine a click frequency (e.g., a query-image frequency distribution) for each multi-term contextual tag that is determined to correspond to a digital image from the search engine logs. Moreover, the digital content contextual tagging system 106 can utilize the query-image frequency distribution to prune (e.g., select a final set of multi-term contextual tags for the digital images in the search queries) by using a frequency threshold. In particular, the digital content contextual tagging system can utilize the frequency threshold as a hyper-parameter utilized to control the quality and number of multi-term contextual tags that are associated with the digital images from the search queries and/or search query logs.

Moreover, the digital content contextual tagging system 106 can utilize the multi-term contextual tags and scores of digital images (determined and associated in accordance with one or more embodiments herein) as ground truth data (e.g., as a ground truth label set for an initial set of multi-term contextual tags). Furthermore, the digital content contextual tagging system 106 utilize the multi-term contextual tags and scores of digital images as ground truth data to train a model to predict multi-term contextual tags using a multi-label image classifier.

Figure 5A:
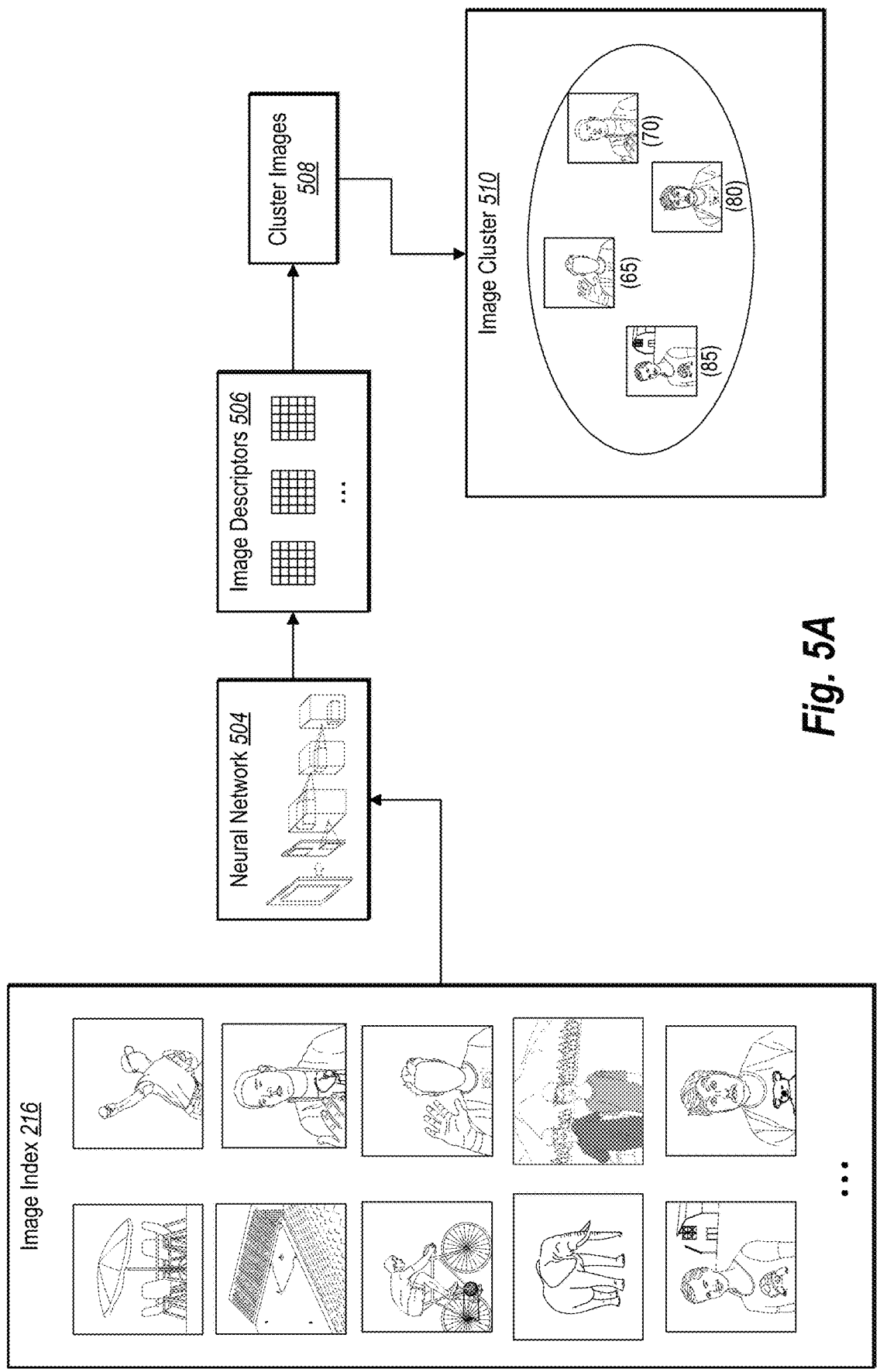
FIG. 5A illustrates a digital content contextual tagging system generating a cluster of images for propagation of multi-term contextual tags in accordance with one or more embodiments.
Figure 5B:
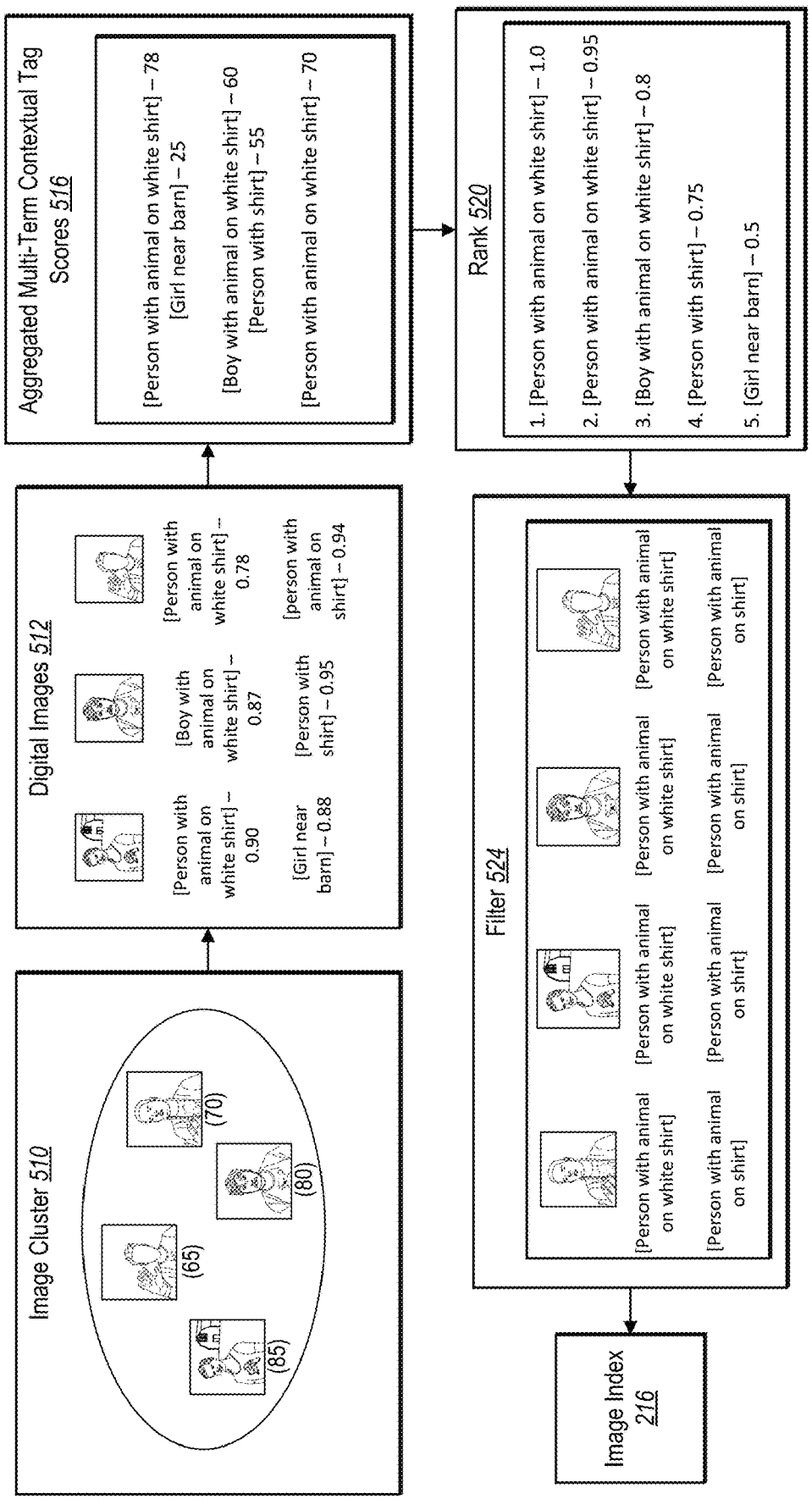
FIG. 5B illustrates a digital content contextual tagging system propagating multi-term contextual tag to additional digital content in accordance with one or more embodiments.

As mentioned above, the digital content contextual tagging system 106 can generate a cluster of one or more images from a collection of images and propagate multi-term contextual tags to the images within the cluster. For example, FIG. 5A illustrates the digital content contextual tagging system 106 generating a cluster of images. Moreover, FIG. 5B illustrates the digital content contextual tagging system 106 propagating one or more multi-term contextual tags to images within the cluster of images.

In particular, as shown in FIG. 5A, the access an image index 216 (e.g., a collection of images) and utilize neural network 504 to generate image descriptors 506 for the images of the image index 216. Furthermore, as illustrated in FIG. 5A, the digital content contextual tagging system 106 can utilize the image descriptors 506 to cluster images in act 508 to generate an image cluster 510. For instance, as shown in FIG. 5A, the image cluster 510 includes images (e.g., images portraying persons wearing white shirts with animals depicted on the shirts) that are determined to be similar by the digital content contextual tagging system 106 utilizing one or more clustering techniques (e.g., k-nearest neighbor). Furthermore, as shown in FIG. 5A, the digital content contextual tagging system 106 can generate similarity scores (e.g., based on K-nearest neighbor distance values) for the one or more images in the image cluster 510.

In one or more embodiments, the digital content contextual tagging system 106 utilizes an image index that includes one or more images that include one or more multi-term contextual tags (determined in accordance with one or more embodiments herein). Indeed, the digital content contextual tagging system 106 can utilize an image index that includes a variety of images that portray a number of objects, attributes, and/or scenarios. For instance, the digital content contextual tagging system 106 can utilize a collection of images such as digital images from ADOBE® STOCK® (as the image index). In one or more embodiments, the digital content contextual tagging system 106 can utilize digital images that are uploaded to one or more online services (e.g., image sharing websites) and/or other image repositories (e.g., publicly available data such as publicly available images).

Furthermore, the digital content contextual tagging system 106 can utilize a neural network that is trained to generate one or more image descriptors for one or more images from a collection of images (e.g., an image index). In particular, the digital content contextual tagging system 106 can utilize a neural network to extract a semantic image descriptor (e.g., an image signature) for the one or more images from the collection of images. Indeed, the image descriptors can include floating point vectors in a higher dimensional space that are learned (e.g., via the neural network) to capture semantic content of an image such visually and semantically similar images are close to each other (e.g., close in distance in the higher dimensional space).

For example, in one or more embodiments, the digital content contextual tagging system 106 utilizes a neural network to generate feature vectors (as image descriptors) for the digital images in a collection of digital images as the image descriptors. Indeed, the digital content contextual tagging system 106 can utilize a neural network, such as a CNN, to generate feature vectors by extracting features (e.g., visual characteristics and/or latent attributes) in different levels of abstractions. Indeed, the neural network can generate feature vectors for a digital image by learning features and/or generating feature vectors for the features by utilizing neural network layers such as, but not limited to, one or more convolution layers, one or more activation layers (e.g., ReLU layers), one or more pooling layers, and/or one or more fully connected layers. Furthermore, the digital content contextual tagging system 106 can utilize a neural network to generate multiple feature vectors from each digital image (e.g., multiple feature vectors for various features learned from a digital image).

Moreover, in one or more embodiments, the digital content contextual tagging system 106 utilizes clustering algorithms (and/or techniques) to cluster digital images from a collection of digital images based on semantic and/or visual similarities of the digital images (e.g., the image descriptors corresponding to the digital images). For instance, the digital content contextual tagging system 106 can utilize clustering techniques such as, but not limited to, K-Means clustering and/or recursive K-Means clustering to cluster the digital images (or image descriptors) from the collection of digital images into clusters of a desirable size based on the similarity of the digital images. In particular, the digital content contextual tagging system 106 can analyze the one or more image descriptors generated from the collection of images to identify image descriptors that are similar. Indeed, the digital content contextual tagging system 106 can determine distance values between the image descriptors to identify similar image descriptors (e.g., to identify a cluster of similar images).

In one or more embodiments, the digital content contextual tagging system 106 utilizes a variety of methods to compare the one or more image descriptors to identify the similar image descriptors. For example, the digital content contextual tagging system 106 can utilize methods (or algorithms) such as, but not limited to, k-nearest neighbor algorithm, cosine similarity calculations, other clustering techniques, and/or embedding spaces to compare the one or more image descriptors to identify the similar image descriptors (e.g., to identify a cluster of similar images). For instance, the digital content contextual tagging system 106 can utilize a k-nearest neighbor algorithm to determine distance values (e.g., a Euclidean distance) between image descriptors within a higher dimensional space (e.g., a Euclidean space). Then, the digital content contextual tagging system 106 can utilize a "k" number of image descriptors (e.g., a number selected and/or configured by a neural network, user of the digital content contextual tagging system 106, and/or the digital content contextual tagging system 106) based on the determined distance values.

Indeed, the digital content contextual tagging system 106 can cluster digital images (or image descriptors) that are similar to each other based on the distance value between the digital images and/or between a digital image and a center of a class or feature represented by a cluster (e.g., a shorter distance value can indicate a stronger similarity between digital images and/or a digital image and the center of a cluster). In particular, the digital content contextual tagging system 106 can utilize a threshold distance value to select the digital images (e.g., select the image descriptors that have a distance value that meets a threshold distance value, set by a server administrator, the digital content contextual tagging system 106, and/or a machine learning model) to generate a digital image cluster. For instance, a digital image cluster can include a "k" number of images that are nearest in distance (e.g., to each other and/or to cluster center that represents a class and/or feature) within the higher dimensional space.

Additionally, the digital content contextual tagging system 106 can also utilize cosine similarity to generate the digital image cluster. In one or more embodiments, the digital content contextual tagging system 106 determines a cosine similarity measurement as a distance value between image descriptors and/or between an image descriptor and a cluster center. For instance, the digital content contextual tagging system 106 can determine angles between image descriptors in a vector space and utilize the angles (or normalized values of the angles) as distance values between the image descriptors. Moreover, the digital content contextual tagging system 106 can also determine angles between image descriptors and centers of one or more clusters in a vector space and utilize the angles as distance values between the image descriptors and the centers of the one or more clusters. Indeed, the digital content contextual tagging system 106 can utilize these distance values (e.g., the cosine similarity measurements) to identify image descriptors that are similar to each other and/or to a center of a cluster to generate an image cluster (e.g., a lesser angle measurement can indicate a stronger similarity between the image descriptors and/or between the image descriptors and a center of a cluster).

In addition to identifying similar image descriptors to generate an image cluster based on one or more methods described above, the digital content contextual tagging system 106 can also determine a degree of similarity between the digital images and/or between the digital images and a center of a cluster. For instance, the digital content contextual tagging system 106 can use the distance values determined between image descriptors (or images) and cluster centers (e.g., the distance value as described above) as the degree of similarity between a digital image and a cluster class. Moreover, the digital content contextual tagging system 106 can utilize this degree of similarity between the digital image and a cluster class to generate an image cluster (e.g., select the top threshold number of digital images based on the nearest distance values between the digital images and a cluster center).

Furthermore, the digital content contextual tagging system 106 can utilize the degree of similarity between the digital images and a cluster center to determine a confidence score indicating how confident the digital content contextual tagging system 106 is that a digital image should belong to a particular cluster (e.g., as the digital image similarity score). In one or more embodiments, the digital content contextual tagging system 106 normalizes the distance values to a scale between 0 and 1 or 1 and 100 to determine the digital image similarity scores. Furthermore, the digital content contextual tagging system 106 can determine the similarity score based on a distance value determined between a cluster center and a digital image and/or a distance value between multiple digital images within a digital image cluster.

Moreover, the digital content contextual tagging system 106 can utilize a neural network to generate image descriptors that are floating point vectors in a higher dimensional space that can be clustered into pseudo classes determined from one or more digital images and/or tags corresponding to the digital images. For instance, the digital content contextual tagging system 106 can utilize a neural network to determine tag-driven pseudo classes. In particular, the digital content contextual tagging system 106 can utilize a pseudo tag prediction task to learn high dimensional semantic features for images to generate the K-nearest neighbors. For example, the digital content contextual tagging system 106 can train a neural network with a large-scale image data set that is weakly annotated with contributor tags (i.e., the original, non-combined tags provided by users and/or annotators). Furthermore, the digital content contextual tagging system 106 can utilize a pseudo labeling technique to reduce the class space while training the neural network.

In particular, the digital content contextual tagging system 106 can utilize images $I_1, I_2, \ldots, I_n \in I$ (e.g., in a set of images I). Moreover, each image $I_i$ has $m_i$ tags $T^i = \{t_1^i, t_2^i, \ldots, t_m^i\}$. Furthermore, the digital content contextual tagging system 106 can define a set of all possible tags as $U = \{u_1, u_2, \ldots, u_M\}$. Then, the digital content contextual tagging system 106 can represent tags of each image $I_i$ to an M dimensional binary vector $b^i$ in accordance with the following:

$$b_j^i = \begin{cases} 1 & \text{when } u_j \in T^i \\ 0 & \text{otherwise} \end{cases}$$

In particular, the $j^{th}$ entry of the vector $b^i$ is 1 only when the image $I_i$ has a tag $u_j$. Furthermore, the digital content contextual tagging system 106 can apply normalization terms to all vectors $b^i$ with consideration of tf (term frequency), idf (inverse document frequency), and L2 norms of the vectors. In particular, the $idf_i$ of each tag $u_i$ is defined in accordance with the following:

$$idf_i = \log \frac{n}{\text{occurence of } u_i}$$

Moreover, the digital content contextual tagging system 106 can utilize the term frequency (e.g., from the tags of images) to normalize varying number of tags for each of the images. Additionally, the digital content contextual tagging system 106 can utilize the inverse document frequency (from above) to assign higher importance to more informative tags since less common tags are more informative (e.g., "Eiffel Tower" is more informative compared to "architecture"). Furthermore, the digital content contextual tagging system 106 can define a Bag of Tags (BoT) representation of each image in accordance with the following:

$$x_j^i = \begin{cases} \frac{idf_i}{m_i} & \text{when } u_j \in T^i \\ 0 & \text{otherwise} \end{cases}$$

Moreover, the digital content contextual tagging system 106 can normalize $x^i$ according to the L2 norm of $\|x^i\|$. Additionally, the digital content contextual tagging system 106 can perform k-means clustering to the $x^i$ vectors (e.g., to form pseudo classes $c_j$). In one or more embodiments, the digital content contextual tagging system 106, during the clustering stage, utilizes an inverted representation for $x^i$ because the vectors are very sparse vectors. For instance, the number of total tags M is usually very large (e.g., more than a hundred thousand tags) and the number of tags $m_i$ of each image $I_i$ is often less than a hundred. Moreover, the digital content contextual tagging system 106 can utilize pseudo classes $c_i$ as clusters. For instance, the digital content contextual tagging system 106 can represent the centroid of the $i^{th}$ class (e.g., the pseudo classes) as $c_i \in \mathbb{R}^M$. In some embodiments, the pseudo classes are weighted combinations of tags. Moreover, the digital content contextual tagging system 106 can utilize the K pseudo classes has hyperparameters to control the granularity of the visual concepts (e.g., K can be in the range of 5000 to 10000 for a training data set in the range of 5-10 million images). Furthermore, the digital content contextual tagging system 106 can utilize images and their pseudo class indices to place visually and semantically similar images close to each other to form an image cluster.

As an example, the digital content contextual tagging system 106 can utilize image tags corresponding to images (e.g., $I_1 = \{t_1^1, t_2^1, \ldots\}$, $I_2 = \{t_1^2, t_2^2, \ldots\}$, $I_n = \{t_1^n, t_2^n, \ldots\}$) to generate M dimensional sparse bag of tags vectors (e.g., $x_1 = [0, 1, 1, 0, \ldots]$, $x_2 = [1, 0, 0, 0, \ldots]$, $\ldots$, $x_n = [0, 0, 1, 1, \ldots]$). Moreover, the digital content contextual tagging system 106 can apply normalization terms to the M dimensional sparse bag of tag vectors (e.g., $x_1, x_2, \ldots, x_n$) with consideration of term frequency, inverse document frequency, and L2 norms of the vectors to cluster the image vectors into k pseudo classes.

Furthermore, the digital content contextual tagging system 106 can utilize the training images and their pseudo class indices to train a classification neural network with images and label pairs. For instance, the digital content contextual tagging system 106 can utilize a ResNet-50 network (e.g., a randomly initialized ResNet-50 network) to train a softmax classification loss on the pseudo classes. Then, the digital content contextual tagging system 106 can utilize the last fully connected layers of the trained network as the visual embeddings (e.g., feature vectors) for the images to determine visually similar neighbors for one or more images. For example, in one or more embodiments, the digital content contextual tagging system 106 utilizes 17 million stock images and an ImageNet dataset to perform multi-task training of a neural network feature representation. Indeed, the digital content contextual tagging system 106 can utilize a dictionary of around 100 thousand tags (with highest frequency) to build a bag-of-tag representation with term frequency-inverse document frequency scores. Moreover, the digital content contextual tagging system 106 can run k-means clustering on the bag-of-tag representation to obtain concept clusters (e.g., the pseudo classes). Additionally, the digital content contextual tagging system 106 can utilize a ResNet-50 network to train a softmax classification loss on all of the clusters. Indeed, the digital content contextual tagging system 106 can utilize the second-to-the-last layer (pool5) layer of the ResNet-50 network as the Stock7 feature representation (e.g., for the images).

Furthermore, the digital content contextual tagging system 106 can utilize the tag based vectors and/or the k pseudo classes to determine distance values between a digital image (e.g., based on the bag of tags vector for the digital image) and a pseudo class (e.g., a cluster center). Indeed, the digital content contextual tagging system 106 can utilize one or more approaches described above to determine a distance value between a tag based vector of a digital image and a pseudo class. Furthermore, the digital content contextual tagging system 106 can also utilize the distance values to determine a digital image similarity score for a digital image belonging to a pseudo class (e.g., a cluster) in accordance with one or more embodiments herein.

Indeed, the digital content contextual tagging system 106 can generate image clusters for the images from the collection of images utilizing visual features (e.g., utilizing image descriptors as described above) and/or by utilizing tag based vectors (e.g., utilizing a bag of tags vector as describe above). In some embodiments, the digital content contextual tagging system 106 utilizes a combination of feature vectors and tag based vectors to generate image cluster. Moreover, the digital content contextual tagging system 106 can also utilize the feature vectors, the tag based vectors, and/or a combination of feature vectors and tag based vectors to determine digital image similarity scores in accordance with one or more embodiments herein.

Furthermore, upon determining a digital image similarity score for a digital image within an image cluster, the digital content contextual tagging system 106 can associate the digital image similarity score with the digital image for the image cluster. Moreover, a digital image can belong to more than one cluster (and be associated with a digital image similarity score corresponding to each separate cluster). Additionally, the digital content contextual tagging system 106 can generate multiple clusters from the collection of digital images in accordance with one or more embodiments to propagate multi-term contextual tags to digital images within the multiple clusters. Indeed, the digital content contextual tagging system 106 can utilize clusters that represent different classes and/or features.

In one or more embodiments, the digital content contextual tagging system 106 utilizes the Optimized Product Quantization technique to approximate the nearest neighbors for one or more images (e.g., to form the image clusters). In particular, the digital content contextual tagging system 106 utilizes the Optimized Product Quantization technique to decompose the high-dimensional vector space (e.g., corresponding to the feature vectors) into a Cartesian product of subspaces and then to quantize these subspaces separately. Indeed, the digital content contextual tagging system 106 can utilize the Optimized Product Quantization technique to compact image representation and enable faster retrieval in the clustering phase (e.g., the K-nearest neighbor clustering phase for the one or more images).

As mentioned above, the digital content contextual tagging system 106 can propagate one or more multi-term contextual tags to one or more additional images from a collection of images. For example, FIG. 5B illustrates the digital content contextual tagging system 106 propagating one or more multi-term contextual tags to one or more images in a cluster of images. In particular, as shown in FIG. 5B, the digital content contextual tagging system 106 identifies digital images 512 that include multi-term contextual tags from the image cluster 510 (e.g., the image cluster 510 generated in FIG. 5A). Indeed, as shown in FIG. 5B, the digital content contextual tagging system 106 identifies the digital images 512 with multi-term contextual tag scores (e.g., the scores associated with the multi-term contextual tags) and/or digital image similarity scores as determined in accordance with one or more embodiments herein.

Moreover, as shown in FIG. 5B, the digital content contextual tagging system 106 generates aggregated multi-term contextual tag scores 516 for the one or more multi-term contextual tags associated with the digital images 512 (e.g., based on factors such as the multi-term contextual tag scores and/or digital image similarity scores). Furthermore, in reference to FIG. 5B, the digital content contextual tagging system 106 utilizes the aggregated multi-term contextual tag scores 516 (and/or tag characteristics) to determine ranking scores (in act 520) for the multi-term contextual tags. Then, as shown in FIG. 5B, the digital content contextual tagging system 106 utilizes the ranking scores (from act 520) of the multi-term contextual tags to filter and associate the multi-term contextual tags (in act 524) to the digital images of the image cluster 510. Moreover, as illustrated in FIG. 5B, the digital content contextual tagging system 106 can store the digital images with the associated multi-term contextual tags (from act 524) in the image index 216 (e.g., back fill into the image collection).

In one or more embodiments, the digital content contextual tagging system 106 identifies one or more digital images having one or more multi-term contextual tags from a cluster of images to propagate those multi-term contextual tags to additional images in the cluster. In particular, the digital content contextual tagging system 106 can identify one or more digital images having one or more multi-term contextual tags from the cluster and also identify associated scores for the digital images. For instance, the digital content contextual tagging system 106 can identify multi-term contextual tag scores and/or image similarity scores for the one or more digital images having the one or more multi-term contextual tags. In some embodiments, the digital content contextual tagging system 106 identifies the one or more digital images having the one or more multi-term contextual tags by cross referencing a set of digital images having one or more multi-term contextual tags determined and associated utilizing search query supervision as described above.

Moreover, the digital content contextual tagging system 106 can generate aggregated scores for the one or more multi-term contextual tags belonging to the one or more digital images (e.g., the digital images 512). In particular, the digital content contextual tagging system 106 can generate an aggregated score for a multi-term contextual tag based on multi-term contextual tag scores for the multi-term contextual tag across one or more digital images that include the multi-term contextual tag. Additionally, the digital content contextual tagging system 106 can utilize one or more factors (e.g., the digital image similarity score, the multi-term contextual tag score, etc.) to weight multi-term contextual tags scores used for an aggregated score and/or the aggregated score of a multi-term contextual tag.

Furthermore, the digital content contextual tagging system 106 can generate an aggregated score for a multi-term contextual tag across one or more digital images by utilizing a variety of aggregation methods. For instance, the digital content contextual tagging system 106 can add multi-term contextual tag scores corresponding to one or more digital images (e.g., across the digital images) to generate an aggregated multi-term contextual tag score. In one or more embodiments, the digital content contextual tagging system 106 calculates a mean value for the multi-term contextual tag scores corresponding to the one or more digital images as the aggregated multi-term contextual tag score. Additionally, in one or more embodiments, the digital content contextual tagging system 106 calculates a median, mode, and/or max from one or more multi-term contextual tag scores corresponding to the one or more digital images to generate an aggregated multi-term contextual tag score. Indeed, the digital content contextual tagging system 106 can utilize a variety of statistical analyses and/or algorithms to aggregate the one or more multi-term contextual tag scores corresponding to the digital images.

Additionally, the digital content contextual tagging system 106 can also provide weights to the individual multi-term contextual tag scores prior to aggregating the multi-term contextual tag scores. For example, as previously mentioned, the digital content contextual tagging system 106 can provide weights to the multi-term contextual tag scores corresponding to each digital image based on one or more factors. For example, the digital content contextual tagging system 106 can utilize a similarity score (and/or distance values from clustering) that is associated with a digital image (e.g., a similarity score based on a relation between the digital image and a cluster of images) to provide a weight to the multi-term contextual tag scores belonging to the digital image.

For instance, the digital content contextual tagging system 106 can amplify (or boost) a multi-term contextual tag score corresponding to the digital image when the digital image includes a high similarity score. Moreover, the digital content contextual tagging system 106 can also dampen the multi-term contextual tag score corresponding to the digital image when the digital image includes a low similarity score. Indeed, the digital content contextual tagging system 106 can determine when the digital image similarity score is high or low based on a threshold similarity score and/or a sliding scale. As an example, multi-term contextual tag scores for digital images having higher digital image similarity scores can be increasingly weighted.

Furthermore, the digital content contextual tagging system 106 can provide weights to the multi-term contextual tag scores based on a combination of factors. For instance, the digital content contextual tagging system 106 can provide a weight to a multi-term contextual tag score (prior to generating an aggregated tag score from one or more multi-term contextual tag scores) based on a combination of the multi-term contextual tag score and a digital image similarity score from the digital image corresponding to the multi-term contextual tag score. For instance, the digital content contextual tagging system 106 can amplify and/or dampen a multi-term contextual tag score prior to generating an aggregated score based on various combinations of the multi-term contextual tag score and a digital image similarity score.

For example, the digital content contextual tagging system 106 can amplify the multi-term contextual tag score of a digital image (e.g., by providing a large weight) when the multi-term contextual tag score is high and the digital image similarity score is high. Moreover, as an example, the digital content contextual tagging system 106 can amplify the multi-term contextual tag score when the multi-term contextual tag score is low and the digital image similarity score is high (e.g., amplify to a lesser extent than when both the multi-term contextual tag score and digital image similarity score are high). Furthermore, as an example, the digital content contextual tagging system 106 can amplify the multi-term contextual tag score when the multi-term contextual tag score is high and the digital image similarity score is low (e.g., amplify to a lesser extent than when both the multi-term contextual tag score and digital image similarity score are high).

In addition, as an example, the digital content contextual tagging system 106 can also dampen the multi-term contextual tag score when the multi-term contextual tag score is high and the digital image similarity score is low. Additionally, as an example, the digital content contextual tagging system 106 can provide no weight to and/or dampen the multi-term contextual tag score when both the multi-term contextual tag score and the digital image similarity score are low. Furthermore, as an example, the digital content contextual tagging system 106 can provide a greater weight to a multi-term contextual tag score when both the multi-term contextual tag score and the digital image similarity score are high compared to a weight provided when the multi-term contextual tag score is low and the digital image similarity score is high. Indeed, the digital content contextual tagging system 106 can amplify and/or dampen a multi-term contextual tag score for use in an aggregated multi-term contextual tag score based on various combinations of a multi-term contextual tag score and a digital image similarity score.

Additionally, the digital content contextual tagging system 106 can utilize other factors and/or combination of other factors to provide a weight to a multi-term contextual tag score for generating an aggregated tag score. For instance, the digital content contextual tagging system 106 can utilize the recency of the multi-term contextual tag (e.g., how recently the multi-term contextual tag has been tagged to the digital image) as a weighing factor for generating an aggregated tag score. Moreover, the digital content contextual tagging system 106 can utilize one or more user interactions corresponding to a digital image and/or multi-term contextual tag, as described above (e.g., purchases, saves, feedback, etc.), as a weighing factor. Furthermore, the digital content contextual tagging system 106 can utilize the number of times a multi-term contextual tag is present across the one or more digital images (from a cluster) as a weighing factor.

In one or more embodiments, the digital content contextual tagging system 106 determines a weighted multi-term contextual tag score (using one or more approaches described above) for each multi-term contextual tag score corresponding to a multi-term contextual tag from a cluster of images. Moreover, the digital content contextual tagging system 106 utilizes the weighted multi-term contextual tag scores to generate an aggregated multi-term contextual tag score in accordance with one or more embodiments herein. Additionally, the digital content contextual tagging system 106 can also utilize the one or more weighting factors (described above) to weight an aggregated multi-term contextual tag score.

Moreover, the digital content contextual tagging system 106 can rank the one or more multi-term contextual tags identified from a cluster of images. In particular, the digital content contextual tagging system 106 can determine a ranking score for the one or more multi-term contextual tags. In some embodiments, the digital content contextual tagging system 106 utilizes the aggregated scores as the ranking scores (e.g., rank the multi-term contextual tags based on their corresponding aggregated tag scores).

In some embodiments, the digital content contextual tagging system 106 normalizes the aggregated tag scores to generate the ranking scores. For instance, the digital content contextual tagging system 106 can normalize (e.g., using a max normalization) the aggregated tag scores by making highest aggregated tag score equivalent to the value of 1 (as the ranking score). Then, the digital content contextual tagging system 106 can determine a normalized ranking score under 1 for the other multi-term contextual tags in relation to the highest aggregated tag score. Moreover, the digital content contextual tagging system 106 can rank the multi-term contextual tags based on the ranking scores (e.g., rank from the highest to lowest ranking scores).

Furthermore, the digital content contextual tagging system 106 can also provide weights to the one or more ranking scores for the multi-term contextual tags (e.g., re-rank the multi-term contextual tags). For instance, the digital content contextual tagging system 106 can provide a weight to (and/or modify) the ranking scores based on tag characteristics. Indeed, the digital content contextual tagging system 106 can utilize tag characteristics of the one or more multi-term contextual tags to provide more or less weight to the ranking scores (e.g., amplify or dampen) associated with the one or more ranking scores. In particular, the digital content contextual tagging system 106 can utilize any number of tag characteristics and/or combination of tag characteristic to weight the ranking scores (or rank) of multi-term contextual tags.

For example, the digital content contextual tagging system 106 can provide weights to ranking scores of the one or more multi-term contextual tags based on the sizes corresponding to the multi-term contextual tags. In particular, in one or more embodiments, the digital content contextual tagging system 106 amplifies (e.g., provides more weight) to multi-term contextual tags when the size of a multi-term contextual tag meets a threshold size (e.g., greater than and/or equal to the threshold size). In some embodiments, the digital content contextual tagging system 106 can weigh the ranking score based on a sliding scale (e.g., increasingly amplifying and/or dampening the ranking score as the multi-term contextual tag size increases and/or decreases). As an example, the digital content contextual tagging system 106 can multiply a ranking score for a multi-term contextual tag that includes six terms by a weight of 1.5 whereas the digital content contextual tagging system 106 can multiply a ranking score for a multi-term contextual tag that includes two terms by a weight of 1.1.

As another example, the digital content contextual tagging system 106 can provide a weight to a ranking score of a multi-term contextual tag based on the complexity and/or specificity of the multi-term contextual tag. In particular, the digital content contextual tagging system 106 can analyze a multi-term contextual tag to determine the complexity and/or specificity of the multi-term contextual tag. For instance, the digital content contextual tagging system 106 can identify the vocabulary utilized in the multi-term contextual tag to determine the complexity and/or specificity of the multi-term contextual tag. Furthermore, the digital content contextual tagging system 106 can provide a weight to the ranking score, by amplifying and/or dampening the ranking score, of the multi-term contextual tag based on the determined complexity and/or specificity of the multi-term contextual tag.

Additionally, as previously mentioned, the digital content contextual tagging system 106 can filter (and/or prune) multi-term contextual tags and associate the filtered multi-term contextual tags with one or more digital images of an image cluster. For instance, the digital content contextual tagging system 106 can utilize ranking scores (as determined above) of one or more multi-term contextual tags to filter the multi-term contextual tags to create a final set of multi-term contextual tags. Indeed, the digital content contextual tagging system 106 can filter a threshold number of tags from the one or more multi-term contextual tags based on their ranking scores. In particular, the digital content contextual tagging system 106 can select a threshold number of multi-term contextual tags by selecting the threshold number of the highest ranked multi-term contextual tags (from a set of ranked multi-term contextual tags) based on corresponding ranking scores. As an example, in reference to FIG. 5B, the digital content contextual tagging system 106 can utilize the two highest ranked multi-term contextual tags (of act 520) as the final set of multi-term contextual tags (of act 524) for the images in the image cluster 510.

In one or more embodiments, the digital content contextual tagging system 106 utilizes a threshold ranking score to filter multi-term contextual tags. For instance, the digital content contextual tagging system 106 can identify multi-term contextual tags that correspond to ranking scores that meet the threshold ranking score (e.g., are greater than or equal to the threshold ranking score). Moreover, the digital content contextual tagging system 106 can utilize the identified multi-term contextual tags (e.g., based on the threshold ranking score) as the final set of multi-term contextual tags for the digital images in an image cluster. For instance, the digital content contextual tagging system 106 can determine a threshold ranking score based various factors such as the size of an image cluster, the number of multi-term contextual tags present in an image cluster, user input, etc.

Furthermore, as previously mentioned, the digital content contextual tagging system 106 can associate the filtered multi-term contextual tags with one or more digital images from an image cluster (e.g., propagate the multi-term contextual tags to the digital images). In particular, the digital content contextual tagging system 106 can associate a filtered, final set of multi-term contextual tags (as determined in accordance with one or more embodiments herein) to digital images belonging to an image cluster (i.e., the additional one or more images). In some embodiments, the digital content contextual tagging system 106 associates the final set of multi-term contextual tags to each digital image of an image cluster. Furthermore, the digital content contextual tagging system 106 can associate the final set of multi-term contextual tags to the digital images as additional tags (e.g., the digital images can have pre-existing tags and/or multi-term contextual tags and newly propagated multi-term contextual tags).

Additionally, the digital content contextual tagging system 106 can also associate (and/or tag) multi-term contextual tag scores (belonging to the multi-term contextual tags from the final set of multi-term contextual tags) with the one or more digital images from the image cluster. For example, the digital content contextual tagging system 106 can utilize the aggregated tag score corresponding to the multi-term contextual tag as the multi-term contextual tag score for the digital images from the image cluster. In one or more embodiments, the digital content contextual tagging system 106 can associate a multi-term contextual tags from a filtered, final set of multi-term contextual tags with digital images of an image cluster with a new multi-term contextual tag score that can be updated (in accordance with one or more embodiments herein) based on future search queries and/or user interactions.

Moreover, upon associating the filtered, final set of multi-term contextual tags with digital images from an image cluster, the digital content contextual tagging system 106 can update a collection of images (e.g., the image index 216) to include the digital images tagged with the multi-term contextual tags from the final set of multi-term contextual tags. Furthermore, the digital content contextual tagging system 106 can also include associated multi-term contextual tag scores for the one or more multi-term contextual tags corresponding to the digital images (from the image cluster) in an image index. Moreover, the digital content contextual tagging system 106 can utilize the digital images corresponding to the propagated multi-term contextual tags, after providing the digital images with updated multi-term contextual tags to an image index, to propagate multi-term contextual tags to additional images within the image index in accordance with one or more embodiments herein.

Additionally, the digital content contextual tagging system 106 can propagate any number of tags to any number of digital images in accordance with one or more embodiments herein. Furthermore, the digital content contextual tagging system 106 can also determine any number of image clusters to propagate one or more multi-term contextual tags to additional images in accordance with one or more embodiments herein. Moreover, a digital image can belong to more than one image cluster. In addition, the digital content contextual tagging system 106 can propagate more than one multi-term contextual tags due to the digital image being present in more than one image cluster in accordance with one or more embodiments herein. Moreover, the digital content contextual tagging system 106 can determine, associate, and/or propagate other information related to digital content (e.g., metadata) in accordance with one or more embodiments herein. In some embodiments, the digital content contextual tagging system 106 can iteratively propagate multi-term contextual tags to digital images (e.g., by determining visually similar images, ranking multi-term contextual tags associated with those similar images, and filtering a final set of multi-term contextual tags for the similar images in accordance with one or more embodiments herein after an initial propagation of multi-term contextual tags).

Figure 6:
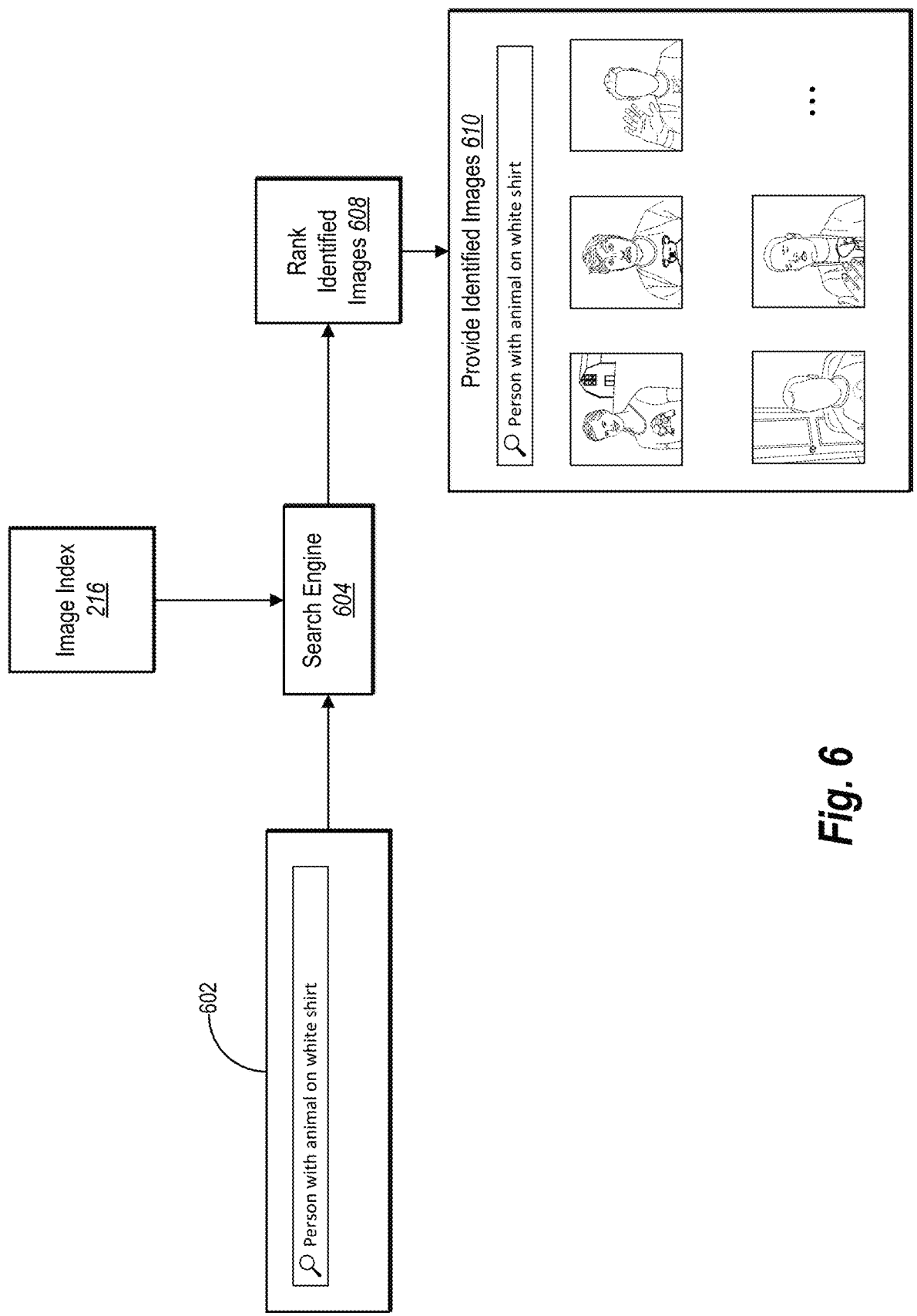
FIG. 6 illustrates a digital content contextual tagging system retrieving digital content based on multi-term contextual tags in response to a search query in accordance with one or more embodiments.

As mentioned above, the digital content contextual tagging system 106 can provide images that correspond to multi-term contextual tags as search results. For instance, as shown in FIG. 6, the digital content contextual tagging system 106 can receive a search query 602 (e.g., "person with animal on white shirt"). Moreover, the digital content contextual tagging system 106 can utilize search engine 604 to determine one or more multi-term contextual tags that match with the search query 602 (e.g., based on search query n-grams). Furthermore, the digital content contextual tagging system 106 can utilize the search engine 604 to identify digital images from the image index 216 that include one or more multi-term contextual tags match the one or more determined multi-term contextual tags based from the search query 602.

Furthermore, as shown in FIG. 6, the digital content contextual tagging system 106 can rank the identified images (from the image index 216) in act 608. For instance, as illustrated in FIG. 6, the digital content contextual tagging system 106 can rank the identified images based on multi-term contextual tag scores associated with one or more multi-term contextual tags that correspond to the search query 602. Indeed, as shown in FIG. 6, upon ranking the identified images in act 608, the digital content contextual tagging system 106 can provide the identified images in act 610 as search results (e.g., images portraying persons wearing animal shirts based on a correspondence to a multi-term contextual tag of "person with animal on white shirt"). Indeed, as illustrated in FIG. 6, the digital content contextual tagging system 106 can utilize propagated multi-term contextual tags to provide more accurate search results in response to search queries by client devices.

In one or more embodiments, the digital content contextual tagging system 106 determines one or more possible multi-term contextual tags for a search query received from a client device. In particular, the digital content contextual tagging system 106 can utilize one or more n-grams of the search query as possible multi-term contextual tags in accordance with one or more embodiments herein. Furthermore, the digital content contextual tagging system 106 can match the one or more n-grams generated from the search query with multi-term contextual tags in an image index to identify one or more multi-term contextual tags that exist in the image index (e.g., a collection of images). Indeed, the one or more possible multi-term contextual tags may include tags that match and/or are relevant to the multi-term contextual tags in the image index. Then, the digital content contextual tagging system 106 can identify digital images from an image index that include the one or more determined possible multi-term contextual tags.

Furthermore, the digital content contextual tagging system 106 can rank the one or more identified images (e.g., the images having one or more multi-term contextual tags that match a search query). In particular, the digital content contextual tagging system 106 can rank the one or more identified images to determine which images to surface as search results and/or in which order to surface the images as search results. For instance, the digital content contextual tagging system 106 can utilize multi-term contextual tag scores associated with the multi-term contextual tags and digital images (in accordance with one or more embodiments herein) to rank the digital images in a search result. Moreover, the digital content contextual tagging system 106 can also utilize multi-term contextual tag characteristics (in accordance with one or more embodiments) to rank the digital images as search results. Then, the digital content contextual tagging system 106 can surface the digital images (and/or some of the digital images) based on the search ranking in response to the search query. Moreover, the digital content contextual tagging system 106 can also order the digital images based on the determined search rankings of the one or more digital images that include multi-term contextual tags corresponding to the search query.

As previously mentioned, by determining and associating multi-term contextual tags for digital images utilizing search query supervision and propagating the multi-term contextual tags to additional images using similarities between the digital images and the additional images, the digital content contextual tagging system 106 can more accurately tag and/or retrieve digital images in response to search queries. For instance, an image and a set of multi-term contextual that were associated to the image in accordance with one or more embodiments herein were utilized to generate image-multi-term contextual tag pairs (for approximately 5000 images from Adobe Stock). These pairs were shown to human annotators without maintaining the generated order of the multi-term contextual tags (e.g., the rankings in accordance with one or more embodiments herein) to rate the image-multi-term contextual tag pairs from 0 to 3 (e.g., 0 being not learned and three being excellently learned). Furthermore, the normalized discounted cumulative gain ("NDCG") was calculated to test if the digital content contextual tagging system 106 ranks the better multi-term contextual tags higher for an image compared to the human annotators. Indeed, the digital content contextual tagging system 106 resulted with the following NDCG scores: ndcg@1: 0.723990, ndcg@2: 0.760361, ndcg@3: 0.780140, ndcg@4: 0.793022, ndcg@5: 0.801294, ndcg@6: 0.808312, ndcg@7: 0.813943, ndcg@8: 0.818855, ndcg@9: 0.822834, and ndcg@10: 0.826580.

Moreover, a search ranking pairwise accuracy was calculated for search queries based on multi-term contextual tags associated with digital images in accordance with one or more embodiments herein. In particular, given a search query session, user purchase impressions were tracked for two images (where both images were in the search query results). The images were tracked to see how often the purchased image has a higher multi-term contextual tag score (that related to the search query) than the image that was not purchased to determine an aggregate pairwise accuracy for the correlation of multi-term contextual tags and purchase data trends. Indeed, the experiment resulted in a 55.5% accuracy (e.g., a positive correlation) between the multi-term contextual tags that were propagated to images and purchase data trends. Furthermore, the experiment resulted in a 58.3% accuracy (e.g., a positive correlation) between original multi-term contextual tags of images and purchase data trends. Therefore, a positive correlation (e.g., useful as a ranking and search query feature) between search queries utilizing multi-term contextual tags (determined and propagated in accordance with one or more embodiments herein) and purchase data were established.

Additionally, ranker tests utilizing the multi-term contextual tags as a feature in the current Adobe Stock ranker model were also performed using purchase data as a signal. Indeed, utilizing multi-term contextual tags (determined and/or propagated in accordance with one or more embodiments herein) resulted in an improvement to the baseline numbers of the current ranker model of Adobe Stock.

Figure 7:
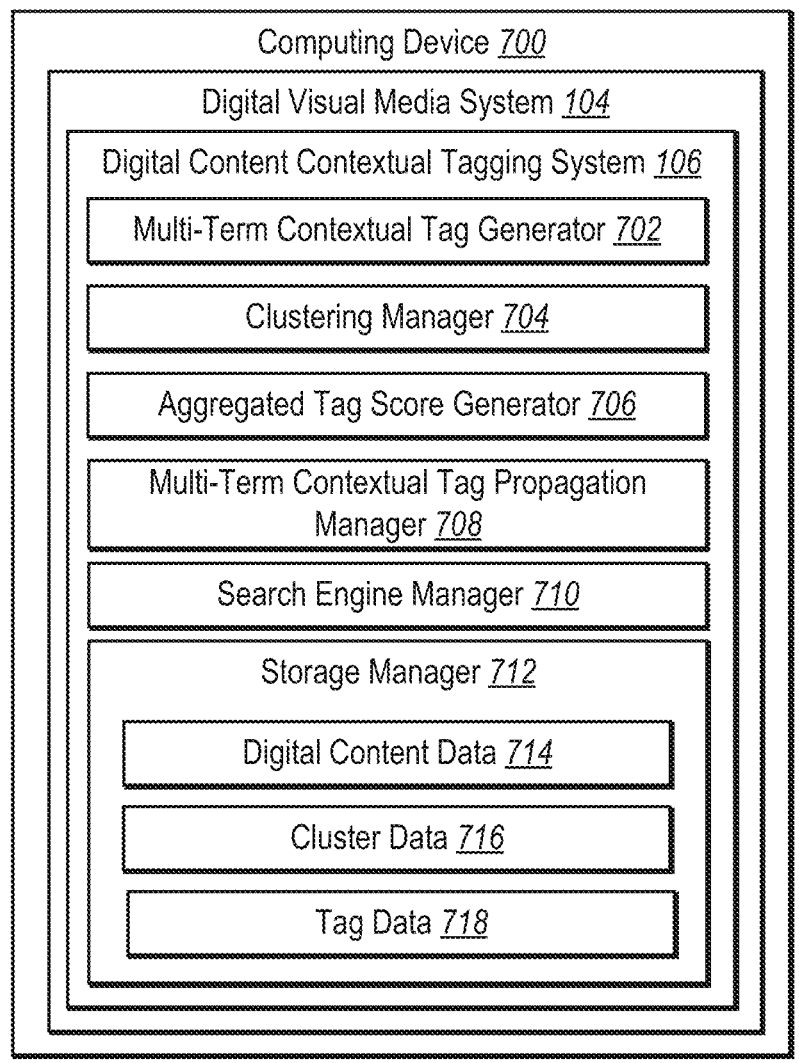
FIG. 7 illustrates a schematic diagram of a digital content contextual tagging system in accordance with one or more embodiments.

Turning now to FIG. 7, additional detail will be provided regarding components and capabilities of one embodiment of the digital content contextual tagging system. In particular, FIG. 7 illustrates an embodiment of an example digital content contextual tagging system 106 executed by a computing device 700 (e.g., the server device(s) 102 and/or the client device 110). As shown by the embodiment in FIG. 7, the computing device 700 can include or host the digital visual media system 104 and the digital content contextual tagging system 106. The digital content contextual tagging system 106 can include a multi-term contextual tag generator 702, a clustering manager 704, an aggregated tag score generator 706, a multi-term contextual tag propagation manager 708, a search engine manager 710, and a storage manager 712 which can include digital content data 714, cluster data 716, and tag data 718.

As just mentioned, and as illustrated in the embodiment in FIG. 7, the digital content contextual tagging system 106 can include the multi-term contextual tag generator 702. For instance, the multi-term contextual tag generator 702 can receive search queries, determine multi-term contextual tags from search queries, detect user selections of digital image search results, match digital image tags with terms of a determined multi-term contextual tag, associate multi-term contextual tags with selected digital images from search result, and/or determine multi-term contextual tag scores as described above (e.g., in relation to FIGS. 2 and 4).

Furthermore, as shown in FIG. 7, the digital content contextual tagging system 106 can include the clustering manager 704. For example, the clustering manager 704 can generate image descriptors for images, cluster images using the image descriptors, and/or generator similarity scores for digital images within a cluster as described above (e.g., in relation to FIGS. 3 and 5A). Additionally, the clustering manager 704 can utilize a neural network and a clustering technique such as a k-nearest neighbor algorithm to generate a cluster of images.

In addition, as shown in FIG. 7, the digital content contextual tagging system 106 can include the aggregated tag score generator 706. For instance, the aggregated tag score generator 706 can identify one or more digital images having multi-term contextual tags, generate aggregated multi-term contextual tag score for multi-term contextual tags across the one or more digital images, and provide weights to the aggregated multi-term contextual tag scores as described above (e.g., in relation to FIGS. 3 and 5B).

Moreover, as shown in FIG. 7, the digital content contextual tagging system 106 can include the multi-term contextual tag propagation manager 708. For example, the multi-term contextual tag propagation manager 708 can rank multi-term contextual tags based on aggregated multi-term contextual tag scores, filter multi-term contextual tags based on ranks to generate a final set of multi-term contextual tags, and/or associate the final set of multi-term contextual tags to digital images belonging to a cluster of images from which the multi-term contextual tags were identified as described above (e.g., in relation to FIGS. 3 and 5B).

Furthermore, as shown in FIG. 7, the digital content contextual tagging system 106 can include the search engine manager 710. For example, the search engine manager 710 can receive a search query, determine multi-term contextual tags relevant for the search query, identify digital images from an image index corresponding to the determined multi-term contextual tags, rank the identified digital images based on multi-term contextual tag scores, and/or provide the ranked digital images as search results as described above (e.g., in relation to FIGS. 3 and 6).

Furthermore, as illustrated in FIG. 7, the digital content contextual tagging system 106 can include the storage manager 712. The storage manager 712 can maintain data to perform the one or more functions of the digital content contextual tagging system 106. As illustrated, the storage manager 712 can include digital content data 714 (e.g., digital images), cluster data 716 (e.g., neural network component data, clustering component data, and/or similarity score data), and tag data 718 (e.g., digital image tags, multi-term contextual tags, multi-term contextual tag scores, and/or aggregated multi-term contextual tag scores).

Each of the components 702-718 of the computing device 700 (e.g., the computing device 700 implementing the digital content contextual tagging system 106), as shown in FIG. 7, may be in communication with one another using any suitable communication technologies. It will be recognized that although components 702-718 of the computing device 700 are shown to be separate in FIG. 7, any of components 702-718 may be combined into fewer components, such as into a single facility or module, divided into more components, or configured into different components as may serve a particular embodiment.

The components 702-718 of the computing device 700 can comprise software, hardware, or both. For example, the components 702-718 can comprise one or more instructions stored on a computer-readable storage medium and executable by processors of one or more computing devices. When executed by the one or more processors, the computer-executable instructions of the digital content contextual tagging system 106 (e.g., via the computing device 700) can cause a client device and/or a server device to perform the methods described herein. Alternatively, the components 702-718 and their corresponding elements can comprise hardware, such as a special purpose processing device to perform a certain function or group of functions. Additionally, the components 702-718 can comprise a combination of computer-executable instructions and hardware.

Furthermore, the components 702-718 of the digital content contextual tagging system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-718 may be implemented as a stand-alone application, such as a desktop or mobile application. Furthermore, the components 702-718 may be implemented as one or more web-based applications hosted on a remote server. The components 702-718 may also be implemented in a suite of mobile device applications or "apps." To illustrate, the components 702-718 may be implemented in an application, including but not limited to, ADOBE® DOCUMENT CLOUD, ADOBE® CAPTIVATE® PRIME, ADOBE® ANALYTICS CLOUD, ADOBE® ANALYTICS, ADOBE® AUDIENCE MANAGER, ADOBE® CAMPAIGN, ADOBE® EXPERIENCE MANAGER, and ADOBE® TARGET. "ADOBE," "ADOBE® DOCUMENT CLOUD," "ADOBE CAPTIVATE PRIME," "ADOBE ANALYTICS CLOUD," "ADOBE ANALYTICS," "ADOBE AUDIENCE MANAGER," "ADOBE CAMPAIGN," "ADOBE EXPERIENCE MANAGER," and "ADOBE TARGET" are either registered trademarks or trademarks of Adobe Inc. in the United States and/or other countries.

Figure 8:
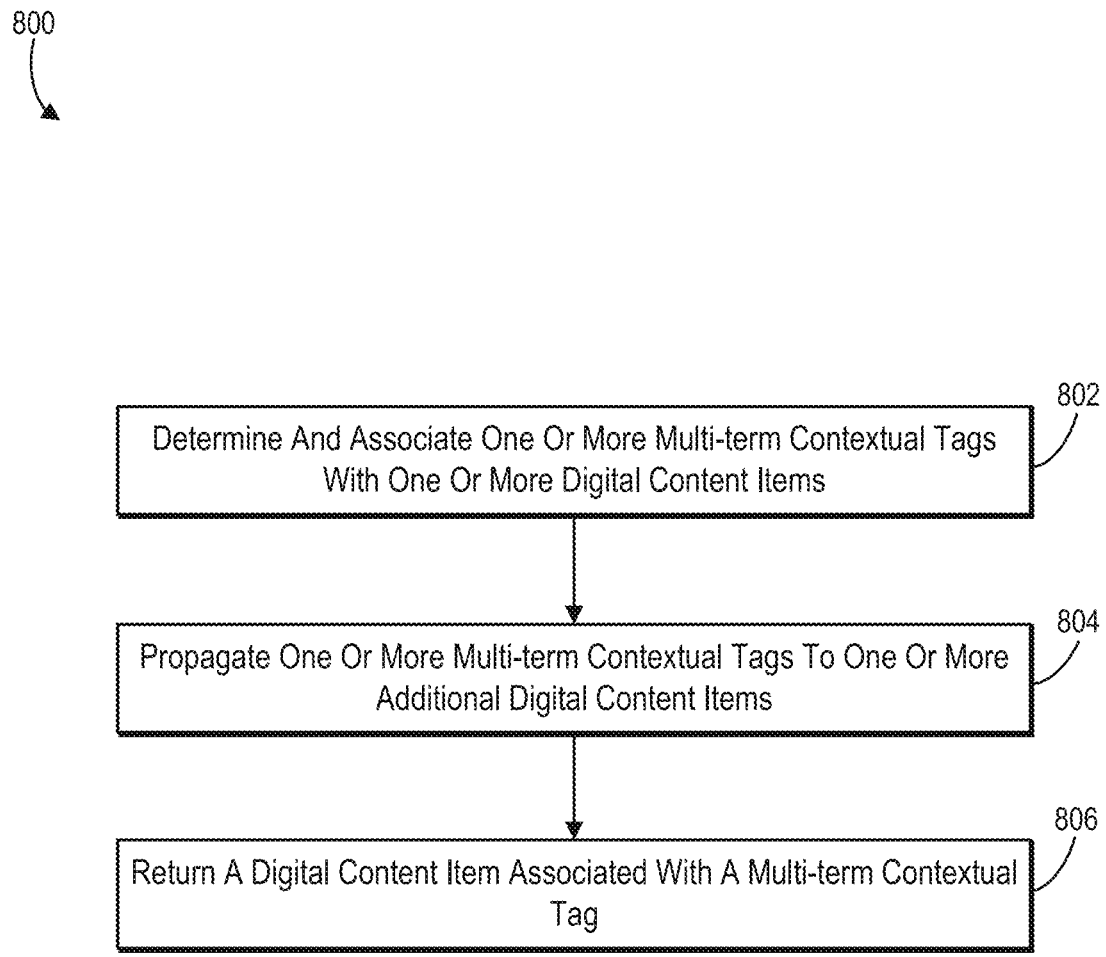
FIG. 8 illustrates a flowchart of a series of acts for determining multi-term contextual tags for digital content and propagating the multi-term contextual tags to additional digital content in accordance with one or more embodiments.

FIGS. 1-7, the corresponding text, and the examples provide a number of different methods, systems, devices, and non-transitory computer-readable media of the digital content contextual tagging system 106. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned above, FIG. 8 illustrates a flowchart of a series of acts 800 for determining multi-term contextual tags for digital content and propagating the multi-term contextual tags to additional digital content in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As illustrated in FIG. 8, the series of acts 800 includes an act 802 of determining and associating one or more multi-term contextual tags with one or more digital content items. In particular, the act 802 can include determining and associating one or more multi-term contextual tags with one or more digital content items based on a correspondence between user search queries, tags of the one or more digital content items, and user selections of the one or more digital content items in response to the user search queries. Furthermore, the multi-term contextual tag can include a plurality of terms that represent a concept based on a relation between the plurality of terms. Furthermore, the act 802 can include determining one or more multi-term contextual tags from user search queries. Moreover, the act 802 can include generating tag scores based on user selection frequencies of one or more digital content items associated with one or more multi-term contextual tags in response to user search queries.

Additionally, the act 802 can include associating one or more multi-term contextual tags with one or more digital content items based on user selections of the one or more digital content items in response to user search queries and one or more terms of the one or more multi-term contextual tags including the tags of the one or more digital content items. Furthermore, the act 802 can include associating one or more multi-term contextual tags with one or more digital content items and generating tag scores for the one or more digital content items based on user selections of the one or more digital content items in response to user search queries and one or more terms of the one or more multi-term contextual tags including tags of the one or more digital content items.

In addition to (or in the alternative to) the acts above, the series of acts 800 can also include a step for determining and associating one or more multi-term contextual tags with one or more digital content items from user search queries. For example, the acts and algorithms described above in relation to FIG. 2 (e.g., the acts 202-216) and FIG. 4 (e.g., the acts 402-414) can comprise the corresponding acts and algorithms (i.e., structures) for performing a step for determining and associating one or more multi-term contextual tags with one or more digital content items from user search queries.

As illustrated in FIG. 8, the series of acts 800 also includes an act 804 of propagating one or more multi-term contextual tags to one or more additional digital content items. In particular, the act 804 can include propagating one or more multi-term contextual tags to one or more additional digital content items based on a similarity between one or more additional digital content items and one or more digital content items associated with the one or more multi-term contextual tags. Additionally, the act 804 can include identifying one or more additional digital content items based on similarities with one or more digital content items associated with one or more multi-term contextual tags. Moreover, the act 804 can include propagating one or more multi-term contextual tags to one or more additional digital content items based on a combination of the tag scores and digital content item similarity scores.

Furthermore, the act 804 can include generating, utilizing a neural network, one or more descriptors for a collection of digital content items. Moreover, the act 804 can include generating a cluster of digital content items from the collection of digital content items using a clustering algorithm and one or more descriptors. For example, the cluster of digital content items can include one or more digital content items associated with one or more multi-term contextual tags. Additionally, the act 804 can include identifying one or more additional digital content items from a cluster of digital content items.

Furthermore, the act 804 can include identifying a set of multi-term contextual tags from digital content items of a cluster of digital content items. Moreover, the act 804 can include determining digital content item similarity scores (for one or more digital content items) based on distance values associated with digital content items of cluster of digital content items. For instance, the clustering algorithm can include a k-nearest neighbor algorithm.

Additionally, the act 804 can include generating a set of aggregated scores for a set of multi-term contextual tags based on a combination of tag scores and digital content item similarity scores. Furthermore, the act 804 can include propagating one or more multi-term contextual tags to one or more additional digital content items by associating the set of multi-term contextual tags with digital content items of a cluster of digital content items based on a set of aggregated scores.

Moreover, the act 804 can include determining a final set of multi-term contextual tags based on a set of aggregated scores and tag characteristics of multi-term contextual tags from a set of multi-term contextual tags. Additionally, the act 804 can include determining ranking scores for a set of multi-term contextual tags based on a set of aggregated scores and tag characteristics of multi-term contextual tags from the set of multi-term contextual tags. For example, the tag characteristics of the multi-term contextual tags can include tag sizes for multi-term contextual tags from a set of multi-term contextual tags. Moreover, the act 804 can include determining a final set of multi-term contextual tags by identifying ranking scores that satisfy a threshold ranking score. Furthermore, the act 804 can include propagating one or more multi-term contextual tags to one or more additional digital content items by associating a final set of multi-term contextual tags with digital content items of a cluster of digital content items.

In addition to (or in the alternative to) the acts above, the series of acts 800 can also include a step for propagating the one or more multi-term contextual tags to one or more additional digital content items. For example, the acts and algorithms described above in relation to FIG. 3 (e.g., the acts 302-318) and FIGS. 5A-5B (e.g., the acts 504-520) can comprise the corresponding acts and algorithms (i.e., structures) for performing a step for propagating the one or more multi-term contextual tags to one or more additional digital content items.

As illustrated in FIG. 8, the series of acts 800 also includes an act 806 of returning a digital content item associated with a multi-term contextual tag. In particular, the act 806 can include receiving an additional search query comprising a multi-term contextual tag and/or returning a digital content item associated with the multi-term contextual tag.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
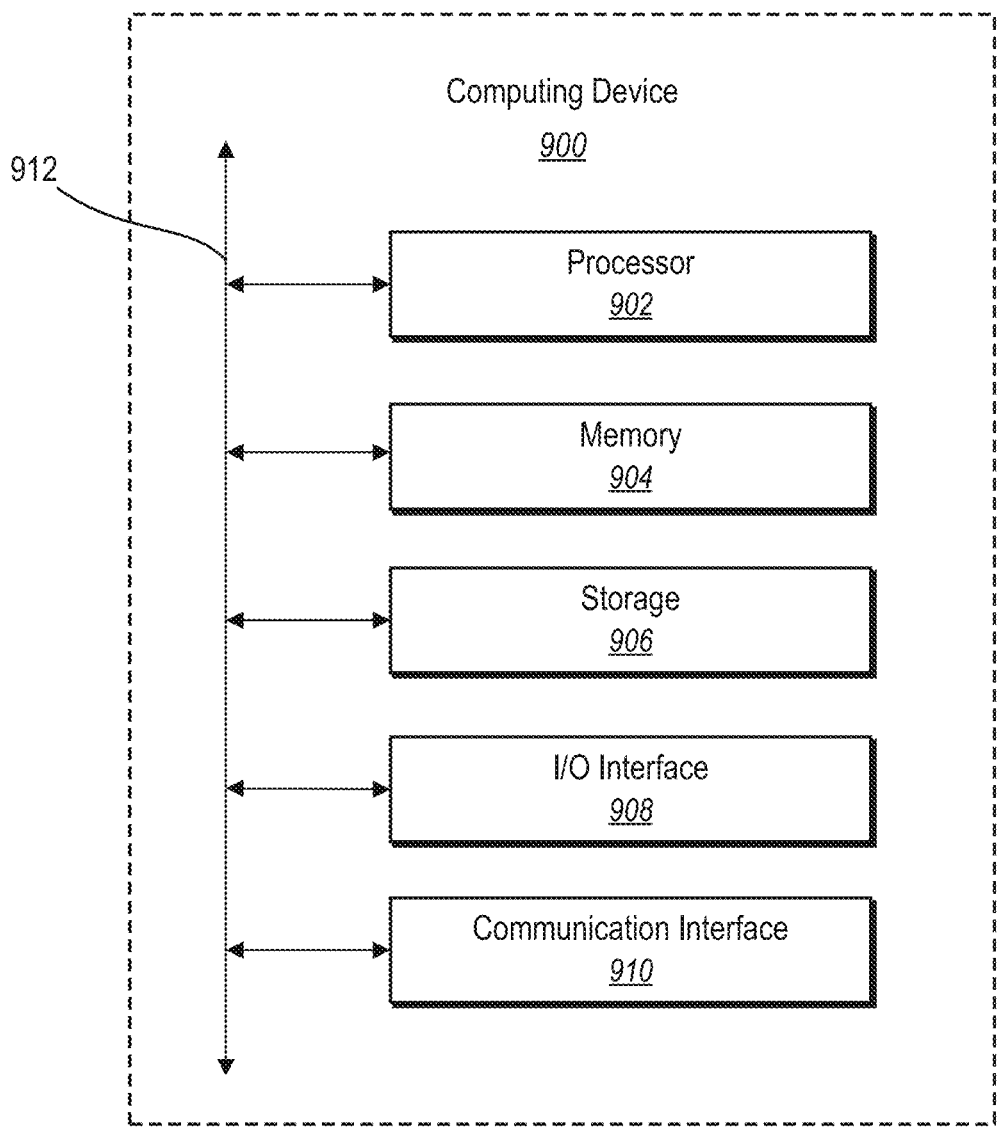
FIG. 9 illustrates a block diagram of an example computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., computing device 700, server device(s) 102, and client device 110). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
    identify one or more tagged digital content items similar to a digital content item utilizing digital content item similarity scores for the one or more tagged digital content items based on similarities between the digital content item and the one or more tagged digital content items;
    modify tag scores, identified from a set of multi-term contextual tags corresponding to the one or more tagged digital content items, utilizing the digital content item similarity scores from the one or more tagged digital content items corresponding to the tag scores;
    determine aggregated tag scores for the set of multi-term contextual tags corresponding to the one or more tagged digital content items utilizing the modified tag scores for the set of multi-term contextual tags; and
    propagate a subset of multi-term contextual tags from the set of multi-term contextual tags to the digital content item based on the aggregated tag scores.

2. The non-transitory computer-readable medium of claim 1, further comprising instructions that, when executed by the at least one processor, cause the computing device to generate the digital content item similarity scores from clusters comprising the one or more tagged digital content items and the digital content item.

3. The non-transitory computer-readable medium of claim 2, further comprising instructions that, when executed by the at least one processor, cause the computing device to generate the digital content item similarity scores from the clusters by determining distance values between the digital content item and the one or more tagged digital content items within the clusters.

4. The non-transitory computer-readable medium of claim 2, further comprising instructions that, when executed by the at least one processor, cause the computing device to:
    generate, utilizing a neural network, one or more descriptors for the digital content item and the one or more tagged digital content items; and
    generate the clusters of the digital content item and the one or more tagged digital content items based on similarities of the one or more descriptors in a feature space.

5. The non-transitory computer-readable medium of claim 1, further comprising instructions that, when executed by the at least one processor, cause the computing device to generate the aggregated tag scores for the set of multi-term contextual tags by combining particular modified tag scores from the modified tag scores for a particular multi-term contextual tag from each of the one or more tagged digital content items.

6. The non-transitory computer-readable medium of claim 5, further comprising instructions that, when executed by the at least one processor, cause the computing device to generate the aggregated tag scores by generating an aggregated tag score for the particular multi-term contextual tag by utilizing a weight based on the digital content item similarity scores corresponding to each of the one or more tagged digital content items for the modified tag scores.

7. The non-transitory computer-readable medium of claim 6, further comprising instructions that, when executed by the at least one processor, cause the computing device to:
    generate, as the modified tag scores, weighted tag scores by modifying the tag scores for the particular multi-term contextual tag from each of the one or more tagged digital content items utilizing the digital content item similarity scores corresponding to each of the one or more tagged digital content items; and
    generate the aggregated tag score for the particular multi-term contextual tag from a combination of the weighted tag scores.

8. The non-transitory computer-readable medium of claim 1, further comprising instructions that, when executed by the at least one processor, cause the computing device to select the subset of multi-term contextual tags by filtering the set of multi-term contextual tags corresponding to the one or more tagged digital content items utilizing a ranking based on the aggregated tag scores.

9. The non-transitory computer-readable medium of claim 8, further comprising instructions that, when executed by the at least one processor, cause the computing device to select the subset of multi-term contextual tags by:
determining ranking scores for the set of multi-term contextual tags based on the aggregated tag scores; and
filtering the set of multi-term contextual tags corresponding to the ranking scores that satisfy a threshold ranking score.

10. A system comprising:
one or more memory devices comprising a plurality of tagged digital content items that correspond to multi-term contextual tags; and
one or more processors configured to cause the system to:
identify one or more tagged digital content items similar to a digital content item utilizing digital content item similarity scores for the plurality of tagged digital content items based on similarities between the digital content item and the plurality of tagged digital content items;
determine aggregated tag scores for a set of multi-term contextual tags corresponding to the one or more tagged digital content items by:
identifying tag scores for a particular multi-term contextual tag from each of the one or more tagged digital content items; and
combining the tag scores to generate an aggregated tag score for the particular multi-term contextual tag; and
propagate a subset of multi-term contextual tags from the set of multi-term contextual tags to the digital content item based on the aggregated tag scores by:
determining ranking scores for the set of multi-term contextual tags based on the aggregated tag scores;
filtering the set of multi-term contextual tags corresponding to the ranking scores that satisfy a threshold ranking score; and
tagging the digital content item with the subset of multi-term contextual tags.

11. The system of claim 10, wherein the one or more processors are further configured to cause the system to:
generate one or more clusters of the digital content item and the one or more tagged digital content items based on similarities of one or more descriptors of the digital content item and the one or more tagged digital content items within a feature space; and
generate the digital content item similarity scores from the one or more clusters.

12. The system of claim 11, wherein the one or more processors are further configured to cause the system to generate the digital content item similarity scores by determining distance values between the digital content item and the one or more tagged digital content items within the one or more clusters.

13. The system of claim 10, wherein the one or more processors are further configured to generate the aggregated tag score for the particular multi-term contextual tags by weighting the tag scores for the particular multi-term contextual tag utilizing the digital content item similarity scores corresponding to each of the one or more tagged digital content items.

14. The system of claim 10, wherein the one or more processors are further configured to identify the digital content item from a digital content item upload from a client device.

15. The system of claim 11, wherein the one or more processors are further configured to generate the one or more clusters utilizing a k-nearest neighbor algorithm.

16. The system of claim 10, wherein the one or more processors are further configured to:
receive a search query comprising a particular multi-term contextual tag; and
returning the digital content item in response to the search query matching a particular multi-term contextual tag from the subset of multi-term contextual tags corresponding to the digital content item.

17. The system of claim 10, wherein the one or more processors are further configured to determine the set of multi-term contextual tags corresponding to the one or more tagged digital content items utilizing user search queries for terms corresponding to the set of multi-term contextual tags.

18. A computer-implemented method comprising:
identifying one or more tagged digital content items similar to a digital content item utilizing digital content item similarity scores for the one or more tagged digital content items based on similarities between the digital content item and the one or more tagged digital content items;
modifying tag scores, identified from a set of multi-term contextual tags corresponding to the one or more tagged digital content items, utilizing the digital content item similarity scores from the one or more tagged digital content items corresponding to the tag scores;
determining aggregated tag scores for the set of multi-term contextual tags corresponding to the one or more tagged digital content items utilizing the modified tag scores for the set of multi-term contextual tags; and
propagating a subset of multi-term contextual tags from the set of multi-term contextual tags to the digital content item based on the aggregated tag scores.

19. The computer-implemented method of claim 18, further comprising generating the digital content item similarity scores from clusters comprising the one or more tagged digital content items and the digital content item.

20. The computer-implemented method of claim 18, further comprising identifying the digital content item from a digital content item upload from a client device.

* * * * *